(12) United States Patent
Hariharan et al.

(10) Patent No.: US 12,033,376 B2
(45) Date of Patent: Jul. 9, 2024

(54) METHOD AND SYSTEM FOR TRAINING NEURAL NETWORK FOR ENTITY DETECTION

(71) Applicant: Quantiphi Inc., Marlborough, MA (US)

(72) Inventors: Reghu Hariharan, Marlborough, MA (US); Jeevan Prakash, Mumbai (IN); Harsh Kothari, Mumbai (IN); Kavitha S, Mumbai (IN); Rajat Jaiswal, Mumbai (IN)

( * ) Notice: Subject to any disclaimer, the term of this patent is extended or adjusted under 35 U.S.C. 154(b) by 148 days.

(21) Appl. No.: 17/552,762

(22) Filed: Dec. 16, 2021

(65) Prior Publication Data
US 2023/0196748 A1 Jun. 22, 2023

(51) Int. Cl.
*G06V 10/00* (2022.01)
*G06V 10/764* (2022.01)
(Continued)

(52) U.S. Cl.
CPC .......... *G06V 10/82* (2022.01); *G06V 10/764* (2022.01); *G06V 10/7747* (2022.01); *G06V 30/10* (2022.01); *G06V 30/18143* (2022.01)

(58) Field of Classification Search
CPC ...... G06V 10/82; G06V 30/10; G06V 10/774; G06V 30/153; G06V 10/764; G06V 20/62; G06V 10/806; G06V 30/19173; G06V 30/413; G06V 30/40; G06V 30/414; G06V 10/462; G06V 10/50; G06V 30/1478; G06V 2201/10; G06V 20/695; G06V 10/20; G06V 40/193; G06V 30/1473; G06V 30/19073;
(Continued)

(56) References Cited

U.S. PATENT DOCUMENTS 10,452,700 B1 * 10/2019 Truong ................ G06N 3/045
2017/0046324 A1 * 2/2017 Hu ....................... G06F 3/04812
(Continued)

FOREIGN PATENT DOCUMENTS

CN 110659574 A 1/2020

OTHER PUBLICATIONS

Li et al, TensorFlow and Keras-based Convolutional Neural Network in CAT Image Recognition, 2nd International Conference on Computational Modeling, Simulation and Applied Mathematics (CMSAM), pp. 529-533 (Year: 2017).*

*Primary Examiner* — Ping Y Hsieh
*Assistant Examiner* — Xiao Liu
(74) *Attorney, Agent, or Firm* — RC Trademark Company

(57) ABSTRACT

A system and method for training a neural network is implemented for detecting at least one entity in a document to derive relevant inferences therefrom. The method describes obtaining at least one document. The at least one document is processed, via a detection module, to detect a widget entity. The detected widget entity is classified as active or inactive based on a detected state of the widget entity. The classified widget entity is modified into a corresponding machine-readable widget-entity based on the detected state. The at least one document is processed, via an extraction module, to detect a text entity in near vicinity of the classified widget entity. A training pair comprising the machine-readable widget entity and the corresponding text entity is generated. The neural network is trained using the generated training pair.

20 Claims, 17 Drawing Sheets

(51) Int. Cl.
  *G06V 10/774* (2022.01)
  *G06V 10/82* (2022.01)
  *G06V 30/10* (2022.01)
  *G06V 30/18* (2022.01)

(58) Field of Classification Search
  CPC ............ G06N 3/08; G06N 20/00; G06N 3/02; G06N 3/0464; G06F 18/24; G06F 18/2413; G06F 18/22; G06F 18/214; G06F 18/2411; G06F 18/241; G06F 16/5846; G06F 40/279; G06F 40/169; G06F 2218/08; G06F 16/7844; G06F 16/75; G06F 16/30
  See application file for complete search history.

(56) References Cited

U.S. PATENT DOCUMENTS

| | | | |
|---|---|---|---|
| 2020/0089946 A1* | 3/2020 | Mallick | G06V 30/416 |
| 2021/0209551 A1* | 7/2021 | Navarra | G06F 16/93 |
| 2021/0256097 A1 | 8/2021 | Jayaraman et al. | |
| 2022/0156300 A1* | 5/2022 | Paruchuri | G06F 16/322 |
| 2022/0197866 A1* | 6/2022 | Delaney | G06F 40/258 |
| 2022/0292258 A1* | 9/2022 | Zeng | G06V 30/413 |
| 2022/0300834 A1* | 9/2022 | Zeng | G06F 40/284 |

* cited by examiner

| a Employee's social security number<br>639-42-8461 | OMB No. 1545-0008 | Safe, accurate,<br>FAST! Use | IRS e~file | Visit the IRS website<br>at www.irs.gov/efile |
|---|---|---|---|---|

| b Employer identification number (EIN)<br>37-4963878 | 1 Wages,tips,other compensation<br>$2061.3 | 2 Federal income tax withheld<br>2486.84 |
|---|---|---|
| c Employer's name, address, and ZIP code<br>Mcpherson, Yoder and Ducan<br>2987 Denise Streets<br>Wendybury TX 61067 | 3 Social security wages<br>2562.58 | 4 Social security tax withheld<br>3162.1 |
| | 5 Medicare wages and tips<br>4970.9 | 6 Medicare tax withheld<br>245.92 |
| | 7 Social security tips<br>661.35 | 8 Allocated tips<br>4619.88 |
| d Control Number<br>5419733 | 9 Verification code | 10 Dependent care benefits<br>$2532.29 |
| e Employee's first name and initial   Last name<br>Sherry       Taylor<br>61816 Robyn Tunnel Suite 570<br>Danmouth    MA 45518 | 11 Nonqualified plans<br>4353.7 | 12a See instructions for box 12<br>T \| 184.11 |
| | 13 Statutory Retirem Third-party<br>employee ent plan Sick pay<br>□       □       □ | 12b<br>V \| $2099.3 |
| | | 12c<br>T |
| | 14 Other | 12d<br>L \| $2550.69 |
| f Employee's address and ZIP code | | |

| 15 State<br>NH | Employer's ID number<br>05-6708574 249 9 | 16 State wages,tips,etc<br>1476.43 | 17 State income tax<br>1211.42 | 18 Local wages,tips,etc<br>$1089.86 | 19 Local income tax<br>4265.9 | 20 Locality name<br>Douglas Hamilton |
|---|---|---|---|---|---|---|
| MI | 61-4011520 753 7 | | 2463.82 | 4458.69 | 4825.63 | Kari Reed |

Form W-2  Wage and Tax Statement    2020    Department of Treasury- Internal Revenue Service Copy B- To be filed with Employee's FEDERAK Tax Return.
This information is being furnished to the Internal Revenue Service.

| a Employee's social security number | OMB No. 1545-0008 | Safe, accurate, FAST! Use | | Visit the IRS website at www.irs.gov/efile |
|---|---|---|---|---|
| 639-42-8461 | | IRS e-file | | |

| b Employer identification number (EIN) | 1 Wages, tips, other compensation | 2 Federal income tax withheld |
|---|---|---|
| 37-4963878 | $2061.3 | 2486.84 |

| c Employer's name, address, and ZIP code | 3 Social security wages | 4 Social security tax withheld |
|---|---|---|
| Mcpherson, Yoder and Ducan | 2562.58 | 3162.1 |
| 2987 Denise Streets | 5 Medicare wages and tips | 6 Medicare tax withheld |
| Wendybury TX 61067 | 4970.9 | 245.92 |
| | 7 Social security tips | 8 Allocated tips |
| | 661.35 | 4619.88 |

| d Control Number | 9 Verification code | 10 Dependent care benefits |
|---|---|---|
| 54.19733 | | $2532.29 |

| e Employee's first name and initial     Last name | 11 Nonqualified plans | 12a See instructions for box 12 |
|---|---|---|
| Sherry      Taylor | 4353.7 | T      184.11 |
| 61816 Robyn Tunnel Suite 570 | 13 Statutory  Retirement  Third-party | 12b |
| Darmouth    MA 45518 | employee  ent. plan  Sick pay | V      $2099.3 |
| | ☐ ☐ ☐ | 12c |
| | 14 Other | T |
| | | 12d |
| | | L      $2550.69 |

| f Employee's address and ZIP code |

| 15 State | Employer's ID number | 16 State wages,tips,etc | 17 State income tax | 18 Local wages,tips,etc | 19 Local income tax | 20 Locality name |
|---|---|---|---|---|---|---|
| NH | 05-6708574 249.9 | 1476.43 | 1211.42 | $1089.86 | 4265.9 | Douglas Hamilton |
| MI | 61-4011520 /53.7 | | 2463.82 | 4458.59 | 4825.63 | Karl Reed |

Form  W-2  Wage and Tax Statement    2020    Department of Treasury - Internal Revenue Service Copy B- To be filed with Employee's FEDERAK Tax Return.
This information is being furnished to the Internal Revenue Service

300C

| a Employee's social security number 639-42-8461 | | OMB No. 1545-0008 | Safe, accurate, FAST! Use | e-file | Visit the IRS website at www.irs.gov/efile |
|---|---|---|---|---|---|
| b Employer identification number (EIN) 37-4963878 | | | 1 Wages, tips, other compensation $2061.3 | | 2 Federal income tax withheld 3486.84 |
| c Employer's name, address, and ZIP code McPherson, Yoder and Duncan 2987 Denise Streets Wendybury TX 61067 | | | 3 Social security wages 2562.58 | | 4 Social security tax withheld 3162.1 |
| | | | 5 Medicare wages and tips 4970.9 | | 6 Medicare tax withheld 245.92 |
| | | | 7 Social security tips 661.35 | | 8 Allocated tips 4619.98 |
| d Control number 5419733 | | | 9 Verification code | | 10 Dependent care benefits $2532.29 |
| e Employee's first name and initial  Last name Sherry Taylor 61816 Robyn Tunnel Suite 570 Danmouth MA 45518 | | Suff. | 11 Nonqualified plans 4353.7 | | 12a See instructions for box 12  184.11 |
| | | | 13 Statutory employee ☐ Retirement plan ☐ Third-party sick pay ☐ | | 12b  $2099.3 |
| | | | 14 Other | | 12c |
| | | | | | 12d  $2550.69 |
| f Employee's address and ZIP code | | | | | |
| 15 State Employer's state ID number | 16 State wages, tips, etc. | 17 State income tax | 18 Local wages, tips, etc. | 19 Local income tax | 20 Locality name |
| WH 05-6708574 249 9 | 1476.43 | 1211.42 | 91089.86 | 4265.9 | Houston Bastion |
| MI 61-4011520 753 7 | | 2463.82 | 4458.69 | 4825.63 | Kaxi Reed |

Form W-2 Wage and Tax Statement  2020  Department of the Treasury—Internal Revenue Service Copy B—To Be Filed With Employee's FEDERAL Tax Return.
This information is being furnished to the Internal Revenue Service.

| a Employee's social security number 639-42-8461 | | OMB No. 1545-0008 | Safe, accurate, IRS e-file EAST! Use | Visit the IRS website at www.irs.gov/efile | |
|---|---|---|---|---|---|
| b Employer identification number (EIN) 37-4963878 | | | 1 Wages,tips,other compensation $2061.3 | 2 Federal income tax withheld 2486.84 | |
| c Employer's name, address, and ZIP code Mcpherson, Yoder and Ducan 2987 Denise Streets Wendybury TX 61067 | | | 3 Social security wages 2562.58 | 4 Social security tax withheld 3162.1 | |
| | | | 5 Medicare wages and tips 4970.9 | 6 Medicare tax withheld 245.92 | |
| | | | 7 Social security tips 661.35 | 8 Allocated tips 4619.88 | |
| d Control Number 5419733 | | | 9 Verification code | 10 Dependent care benefits $2532.29 | |
| e Employee's first name and initial   Last name Sherry      Taylor 61816 Robyn Tunnel Suite 570 Danmouth    MA 45518 | | | 11 Nonqualified plans 4353.7 | 12a See instructions for box 12 T  \|184.11 | |
| | | | 13 Statutory Retirem Third-party employee ent plan Sick pay ☐    ☐    ☐ | 12b V  \|$2099.3 | |
| | | | | 12c T | |
| | | | 14 Other | 12d L  \|$2550.69 | |
| f Employee's address and ZIP code | | | | | |
| 15 State NH | 16 State wages,tips,etc 1476.43 | 16 State wages,tips,etc 1476.43 | 17 State income tax 1211.42 | 18 Local wages,tips,etc $1089.86 | 19 Local income tax 4265.9 | 20 Locality name Douglas Hamilton |
| MI | 61-4011520 753 7 | | 2463.82 | 4458.69 | 4825.63 | Kari Reed |

Form W-2  Wage and Tax Statement    2020    Department of Treasury- Internal Revenue Service Copy B- To be filed with Employee's FEDERAK Tax Return.
This information is being furnished to the Internal Revenue Service.

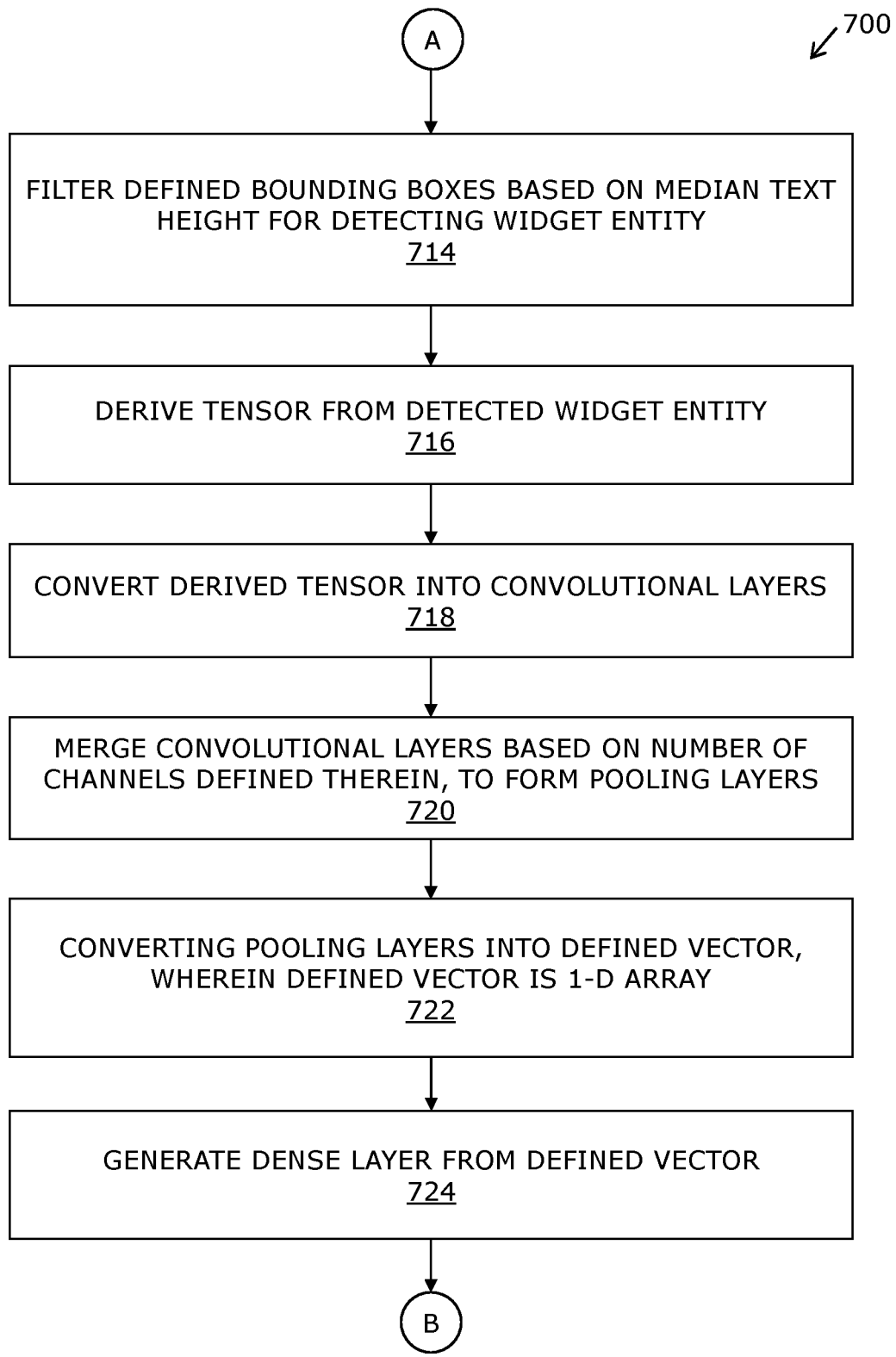

METHOD AND SYSTEM FOR TRAINING NEURAL NETWORK FOR ENTITY DETECTION

TECHNICAL FIELD

The present disclosure relates generally to automated entity detection systems and methods; and more specifically, to a system and a method for training a neural network to be implemented for detecting at least one entity in a document to derive relevant inferences therefrom.

BACKGROUND

In recent times, the usage of entity detection systems to detect various types of entities has increased rapidly. For example, implementation of detection systems for detecting a widget entity in a document that represents characteristic information pertaining to the document. Generally, a document widget may be processed in accordance with an optical recognition process so as to identify document characteristics and enable document information to be extracted. However, such documents are not completely readable as they may comprise a human-readable element or portion that provides for a distinction between different documents by virtue of the widget entity and consequently identifiable by a skilled person or operator observing the document.

Conventionally, the process of detecting any specific entity from a printed or a hand-written document is done manually, as it requires a level of human intelligence for the process to be carried with efficiency and precision. As a result, the process of entity detection becomes highly cumbersome, time consuming and requires extensive use of human resources and intelligence. However, on account of the growth in the machine learning and artificial intelligence industry, the existing techniques for the detection of an entity in a document are being automated in order to increase the efficiency and accuracy of the system and the same time, removing the need for human involvement altogether.

However, the replacement of human involvement by the automated techniques for entity detection, has resulted in of the removal of human input i.e., intelligence that was previously responsible for manually analysing and developing associated patterns therein for accurate implementation of the detected entity and to develop a better understanding of the context and/or the purpose for which the entity is being detected. Thus, there arises a need for techniques that completely automates the process of entity detection and at the same time derives relevant inferences and patterns with respect to the detect entity accurately and efficiently.

Therefore, in light of the foregoing discussion, there exists a need to overcome the aforementioned drawbacks associated with techniques for detection of an entity in a document.

SUMMARY

An object of the present disclosure is to provide a method for training a neural network to be implemented for detecting at least one entity in a document to derive relevant inferences therefrom. Another object of the present disclosure is to provide a system for training a neural network to be implemented for detecting at least one entity in a document to derive relevant inferences therefrom. Another object of the present disclosure is to provide a solution that overcomes at least partially the problems encountered in the prior art.

In an aspect, an embodiment of the present disclosure provides a method for training a neural network to be implemented for detecting at least one entity in a document to derive relevant inferences therefrom, comprising:
  obtaining at least one document;
  processing, the at least one document via a detection module to detect a widget entity, wherein the detected widget entity is classified as active or inactive based on a detected state of the widget entity;
  modifying, the classified widget entity into a corresponding machine-readable widget-entity based on the detected state;
  processing, the at least one document via an extraction module to detect a text entity in near vicinity of the classified widget entity;
  generating a training pair comprising the machine-readable widget entity and the corresponding text entity; and
  training the neural network using the generated training pair.

In another aspect, the present disclosure provides a method for detecting at least a widget entity in a document to derive relevant inferences therefrom, comprising:
  obtaining at least one document;
  converting the at least one document into a gray document;
  thresholding the gray document to form a binary document;
  performing morphological transformations on the binary document to detect horizontal and vertical edges therein;
  performing morphological dilation on the detected horizontal and vertical edges to provide improved horizontal and vertical edges;
  defining bounding boxes associated with pairs of the improved horizontal and vertical edges;
  filtering the defined bounding boxes based on a median text height for detecting the widget entity;
  deriving a tensor from the detected widget entity;
  converting the derived tensor into convolutional layers;
  merging the convolutional layers based on a number of channels defined therein, to form pooling layers;
  converting the pooling layers into a defined vector, wherein the defined vector is a 1-D array;
  generating a dense layer from the defined vector;
  performing a sigmoid function on the generated dense layer to classify the widget entity;
  modifying, the classified widget entity into a corresponding machine-readable widget entity based on the detected state;
  processing, the at least one document via an extraction module to detect a text entity in near vicinity of the widget entity; and
  employing the machine-readable widget-entity and the associated text entity to derive the relevant inferences therefrom.

In another aspect, the present disclosure provides a method for detecting at least one entity in a document, the method comprising:
  inputting the at least one document to the trained neural network; and
  executing the trained neural network to detect the at least one entity.

In yet another aspect, an embodiment of the present disclosure provides a system for training a neural network to be implemented for detecting at least one entity in a document to derive relevant inferences therefrom, the system comprising:
   a database configured to store at least one document; and
   a processor communicably coupled to the database, wherein the processor is configured to:
      process, the at least one document via a detection module to detect a widget entity, wherein the detected widget entity is classified as active or inactive based on a detected state of the widget entity;
      modify, the classified widget entity into a corresponding machine-readable widget-entity based on the detected state;
      process, the at least one document via an extraction module to detect a text entity in near vicinity of the classified widget entity;
      generate a training pair comprising the machine-readable widget entity and the corresponding text entity; and
      train the neural network using the generated training pair.

Embodiments of the present disclosure substantially eliminate or at least partially address the aforementioned problems in the prior art and enable efficient generation of the search string for the input query to find relevant references.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 3A to 3I illustrate exemplary visual representations of each of the steps implemented by the detection module of FIG. 2 configured for detecting the widget entity, in accordance with various embodiments of the present disclosure;

FIGS. 7A to 7C illustrated is a flowchart depicting steps of a method for detecting at least a widget entity in a document to derive relevant inferences therefrom, in accordance with various embodiments of the present disclosure.

DETAILED DESCRIPTION OF EMBODIMENTS

Figure 1:
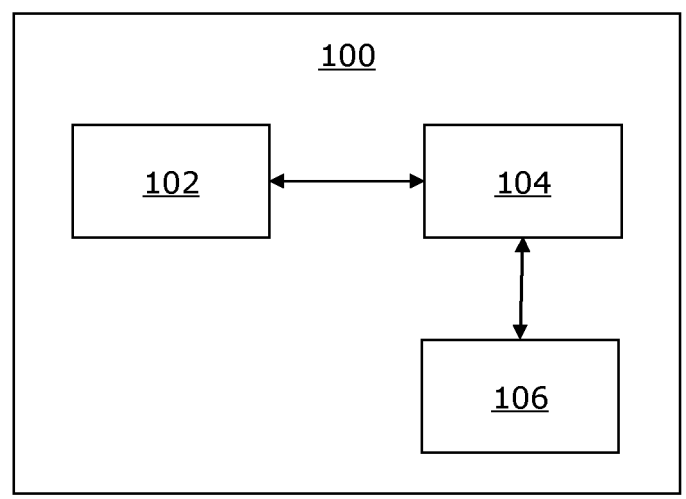
FIG. 1 is a block diagram of a system for training a neural network to be implemented for detecting at least one entity in a document to derive relevant inferences therefrom, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for training a neural network to be implemented for detecting at least one entity in a document to derive relevant inferences therefrom, comprising:
   obtaining at least one document;
   processing, the at least one document via a detection module to detect a widget entity, wherein the detected widget entity is classified s active or inactive based on a detected state of the widget entity;
   modifying, the classified widget entity into a corresponding machine readable widget-entity based on the detected state;
   processing, the at least one document via an extraction module to detect a text entity in near vicinity of the classified widget entity;
   generating a training pair comprising the machine readable widget entity and the corresponding text entity; and
   training the neural network using the generated training pair.

Generally, the process of detecting an entity from within a document is a manual operation aided by human intelligence. However, such manual operations of entity detection require skilled personnel for operation and still result in higher time consumption and reduced efficiency. Consequently, there arises a need for automation of the existing techniques and systems for the detection of such entities to reduce the time taken and improve the efficiency of such entity detection operations.

The present disclosure seeks to provide a method for training a neural network to be implemented for detecting at least one entity in a document to derive relevant inferences therefrom. The method is configured to train the neural network to automatically detect each or at least part of the entities i.e., required to be detected using the method.

It will be appreciated that the method may be trained to detect each of the entities present in the document or based on the implemented may detect only part of the entities (such as, widget entities or text entities) to improve the efficiency of the system. Herein, the term "neural network" refers to a network which mimics the working of a human brain by involving a series of algorithms configured to recognize underlying relationships in a set of a data. Similar, to the way a human brain works with the help of neurons, the working of neural networks is dependent on the artificial neurons. The neural network on being completely trained is then implemented to replace the human involvement resulting in an efficient fast-paced method for detecting the at least one entity in a document. For example, the document can be in the form of a research paper, a journal, a technical document, an article, a legal document etc.

In one or more embodiments, the at least one entity comprises at least one of a widget entity, a text entity, an image entity, or an object entity, and wherein the widget entity comprises at least one of the bounding box, a checkbox, a list, a checkbox list, a radio button, an array. Herein, the term "widget entity" refers to an application or a component of an interface enabling a user to perform a function or access a service. For example, the widget entity is a checkbox, to be checked by a user in case of satisfying context requirement. Optionally, the at least one entity is selected from at least one of a bounding box, a checkbox, a list, a checkbox list, a radio button, an array. Herein, the "text entity" refers to a particular group of words or sentences in a document. Generally, any document comprises a variety of entities that are required to be detected via the method to be further utilized for deriving inferences therefrom. The inferences relate to the implementation of the trained neural network in a variety of applications including, but not limited to, data collection, data interpretation, data analysis and the like. In an example, the document comprising the at least one entity further comprises a plurality of text entities, three widget entities, two object or image entities and the like. However, it will be appreciated that there may be numerous entities in the at least one document that can be detected and thereby processed via the method for deriving relevant inferences therefrom.

The method comprises obtaining at least one document. Herein, the at least one document can be one or more of a user profile, a user history, a medical history, a research paper, a journal, a technical document, an article, a legal document and the like. Typically, the document relates to any machine readable or non-machine readable information (later converted to machine readable information) that may be required to be analyzed and detected by the method. The neural network would be trained accordingly to detect the at least one entity from the at least one document obtained employed for the purpose of training. For example, the neural network may obtain five identity documents and two research papers and subsequently, each of the five identity documents and the two research papers would be used for the purpose of training the neural network for detecting the at least one entity.

The method further comprises processing, the at least one document via a detection module to detect a widget entity, wherein the detected widget entity is classified as active or inactive based on a detected state of the widget entity. Herein, the "detection module" refers to a module configured to carry out one or more processes for the detection of any entity or object depending upon the implementation of the device, system, apparatus, or method in which the detection module is being used. Subsequently, the method of the present disclosure employs the detection module to detect the presence of the widget entity in the at least one document. Herein, the detection module comprises in-built feature and algorithms (such as, detection and classification algorithms) configured for detecting and thereby classifying to indicate a status of the widget entity i.e., indicating whether the widget entity has been enabled or not. Depending upon the indication status of the detected widget entity, the detected widget entity is classified as active if the detected widget entity is indicated to be enabled, whereas the detected widget entity is classified as inactive if the detected widget entity is indicated to be disabled. In an example, the widget entity is a checkbox, wherein if the widget entity is checked or marked, then the widget entity is classified as active and if the widget entity is unchecked or unmarked, then the widget entity is classified as inactive.

In an embodiment, the detection module comprises at least one of an object detection algorithm, an image recognition algorithm, or a text-recognition algorithm. Herein, the object detection algorithm refers to the algorithms and/or techniques which allows the method to detect or identify and locate entities in an image or a document. Herein, the image recognition algorithm refers to the technique to identify objects, logos, images, places, people etc. in images. Further, the text-recognition algorithm refers to the technique which allows to analyze printed or hand-written documents in order to detect particular text from within the document. Herein, the method in the present disclosure may use at least one or more of the object detection algorithm, the image recognition algorithm or the text-recognition algorithm to detect the widget entity in the document for further processing thereof.

In an embodiment, the object detection algorithm is performed using at least one of a region based convolutional neural network (R-CNN), a fast R-CNN, Histogram of oriented gradients, Single shot detector (SSD), Spatial Pyramid Pooling (SPP-net), You only look once (YOLO) algorithm and the like. Herein, the "region based convolutional neural network (R-CNN)" refers to algorithms comprising two distinct operations i.e., classification and localization (or detection). Beneficially, the R-CNN enables extraction of a region of interest from the obtained at least one document, to be used for detecting the at least entity. Herein, the "Histogram of oriented gradients" refers to a feature descriptor used in computer vision and image processing for the purpose of object detection. Herein, the "Single shot detector (SSD)" refers to an algorithm that a singular shot to detect multiple entities present in an image or a document, such as using a multi-box. Herein, the "You only look once (YOLO)" refers to algorithms employing neural networks for real-time entity detection. It will be appreciated that the object detection may be performed using one or more of the aforementioned object detection algorithms based on the implementational requirements to detect the at least one entity via the method in an efficient manner. Optionally, the image recognition algorithm is performed using at least one of Scale-invariant Feature Transform (SIFT), Speeded Up Robust Features (SURF), Principal Component Analysis (PCA), and Linear Discriminant Analysis (LDA). Herein, the "Scale-invariant Feature Transform (SIFT)" refers to computer vision algorithms to detect, describe, and match local features in images. Herein, the "Speeded Up Robust Features (SURF)" refers to a local feature detector and descriptor that can be used for tasks such as entity recognition and image registration.

In an embodiment, processing the at least one document via the detection module, comprises converting the at least one document into a gray document. Herein, the "gray document" refers to a document which undergoes gray conversion. Typically, the obtained at least one document is converted into the gray document. Further, processing the at least one document via the detection module comprises thresholding the gray document to form a binary document. Herein, thresholding refers to an image processing technique used to create a binary image by setting a threshold value on the pixel intensity of the original image. Typically, the method of the present disclosure converts the obtained at least one document into the gray document to simplify the process of subsequently converting the gray document into the binary document and to improve the efficiency of the method on account for the comparatively easier conversion into the binary document using the thresholding technique.

Herein, the binary document refers to a document represented in a binary format, for example a black and white format i.e., comprises only two colours: black and white.

In an embodiment, processing the at least one document via the detection module further comprises performing morphological transformations on the binary document to detect horizontal and vertical edges therein. The "morphological transformation" refers to simple operations performed on binary images based on the shape of the image. The morphological transformation requires two inputs i.e., an input image (from the at least one document) and a structuring element, configured to decide the nature of the morphological transformation. Typically, the morphological transformations included edge detection algorithms, wherein the edges of each of the at least one entity in the document are identified by the method. It will be appreciated that the morphological transformations may be configured based on the implementation such as, aided by an image recognition algorithm to potentially detect entities without edges. Herein, the binary document is processed to detect horizontal edges and then vertical edges for each of the at least one entity in the at least one document. Subsequently, once the binary document is processed via the morphological transformations, the detection module detects each of the vertical and horizontal edges present in the binary document. Furthermore, processing the at least one document via the detection module comprises, performing morphological dilation on the detected horizontal and vertical edges to provide improved horizontal and vertical edges. Herein, "morphological dilation" refers to the process of adding pixels to the edges or boundaries of the at least one entity (or object) present in the at least document. Subsequently, adding more pixels by performing morphological dilation on the detected horizontal and vertical edges, results in providing improved horizontal and vertical edges having an improved quality and contrast and as result makes the detected edges more precise and thereby the detection via the method accurate.

In an embodiment, processing the at least one document via the detection module further comprises, defining bounding boxes associated with pairs of the improved horizontal and vertical edges. Herein, the "bounding box" refers to an enclosing element that may be in the form of a rectangle or any other quadrilateral defining the at least one entity. Herein, to define the bounding box, a pair of improved horizontal edges from amongst each of the improved horizontal edges are combined with a pair of improved vertical edges from within each of the improved vertical edges to define the bounding box. As a result, the bounding box is defined for each of the possible combination between the pairs of improved horizontal and vertical edges for further processing thereof.

In an embodiment, processing the at least one document via the detection module further comprises, filtering the defined bounding boxes based on a median text height for detecting the widget entity. Herein, each of the defined bounding boxes are processed based on the median text height. Typically, the defined bounding boxes are filtered to determine the bounding boxes having a configuration similar to the widget entity. Alternatively stated, a median text height filter is used to detect the median height of the text associated with the widget entity and remove any unwanted noise (if required) to filter the widget entity from amongst the at least one entity in the document. The "median text height filter" is a non-linear digital filtering technique, often used to remove noise from any document, image or signal to enable edge detection and thereby enable detection of the widget entity via the method. Beneficially, such a noise reduction is a typical pre-processing step to improve the accuracy and quality of results for later processing (for example, edge detection on an image).

In an embodiment, upon detecting the widget entity in the obtained at least one document, the method further comprises classifying the detected widget entity using a classification algorithm. The classification via the classification algorithm comprises deriving a tensor from the detected widget entity. Herein, the "tensor" refers to the multi-dimensional arrays that are a way of representing data in algorithms involving deep learning. The system of the present disclosure may derive the tensor from the detected entity as a way of representing the data of the detected entity. The classification via the classification algorithm further comprises converting the derived tensor into convolutional layers. Herein, the "convolutional layers" refers to the layers that are obtained as a result of application of the process of convolution on the derived tensor. Typically, convolution is used in order to perform a variety of functions such as blurring and sharpening of images. Subsequently, the tensor derived from the detected widget entity gets converted into convolutional layers. Further, the classification via the classification algorithm further comprises merging the convolutional layers based on a number of channels defined therein, to form pooling layers. Herein, the "pooling layers" represents the summarization of the features that are present in a region of a feature map generated by the converted convolutional layers. Thus, in the feature map generated by the convolutional layers, the features present in each region would be summarized to give rise to a particular pooling layer. Furthermore, the classification via the classification algorithm further comprises converting the pooling layers into a defined vector, wherein the defined vector is a 1-D array. Optionally, the defined vector may a multi-dimensional vector array, for example a 2-D array or a 3-D array, generating a dense layer from the defined vector. Furthermore, the classification via the classification algorithm further comprises generating a dense layer from the defined vector. Herein, the "dense layer" is a type of layer used, wherein each neuron in the dense layer takes an input from all the outputs of a previous layer. Subsequently, the dense layer is generated, wherein each neuron of the dense layer is receiving the input from all of the neurons present in a preceding layer i.e., from the defined vector. Furthermore, the classification via the classification algorithm further comprises performing a sigmoid function on the generated dense layer to classify the widget entity. Herein, the "sigmoid function" refers to a mathematical function, represented as $\sigma(\kappa)=1/(1+e^{-\kappa})$, wherein the sigmoid function takes a real valued number as an input to be configured into a range of 0 to 1. Herein, the sigmoid function may be applied to the dense layer as the input in order to form the resultant sigmoid layer. Based on the result of the sigmoid layer, the database may classify the detected widget entity as active or inactive.

The method further comprises modifying, the classified widget entity into a corresponding machine readable widget-entity based on the detected state. Notably, the classified widget entity being detected is not in a machine-readable format and thereby requires human-input for the document to be read and analyzed accordingly. Thus, to overcome the aforementioned problem and eliminate any or all human involvement to make the method completely automated, the method comprises modifying the classified widget entity into the corresponding machine readable entity. Herein, the term "machine readable" refers to the data in a format which can be processed by a computer. As a result, the classified widget entity has to be converted into the corresponding machine readable widget entity necessarily in order to be used for the training of the neural network. Herein, modification of the detected widget entity into the corresponding machine readable widget entity comprises conversion of the detected widget entity into a type of text-entity having a similar shape and size of the widget entity and also comprises the state of the associated widget entity that is made machine-readable upon conversion via the method.

The method further comprises processing, the at least one document via an extraction module to detect a text entity in near vicinity of the classified widget entity. Herein, the "extraction module" refers to a set of algorithms and/or techniques applied to extract the data present in a certain document in order for the data to extracted and analyzed for further implementation. Hence, to process the data stored in the at least one document for the training of the neural network, the data is to be extracted in the text format from the at least one document using the extraction module. For example, the extraction module comprises optical character recognition algorithm to identify and thereby extract one or more desired text entities from the at least one document. Subsequently, from within the extracted data, the text entity in the near vicinity of the classified widget entity i.e., the text entity which is the nearest to location of the classified widget entity is detected. The detected text entity nearest to the classified widget entity may contain labels specifying the purpose and context of the classified widget entity.

Optionally, processing the at least one document via the extraction module comprises utilizing location of the detected widget entity to detect the text entity in near vicinity based on a shortest distance. Herein, the location of the detected widget entity is detected by the detection module and may be passed on to the extraction module to process the document and extract the text entity which may be at the shortest distance from the detected widget entity. Typically, the distance between the detected widget entity and each of the text entities in near vicinity of the detected widget entity is calculated and thereby compared to determine the shortest distance for associating the text entity at the shortest distance to the detected widget entity to beneficially obtain the information, context and type associated with the widget entity.

Optionally, the extraction module comprises at least an Optical Character Recognition (OCR) software. Herein, the Optical Character Recognition software refers to a software designed for the automation of the data extraction from printed or written text from a scanned document or an image file and then converting the data into machine readable format to be used for data processing. Hence, the extraction module may be at least using the Optical Character Recognition software to extract the data such as, the text entity from the at least one document.

The method further comprises generating a training pair comprising the machine-readable widget entity and the corresponding text entity. Herein, the training pair refers to the input training dataset required to train the neural network. Typically, for each of the at least one document obtained via the method, each of the detected widget entity detected by the detection module and converted into the corresponding machine-readable entity to be paired or associated with the corresponding nearest text entity detected by the extraction module in order to generate the desired training pair for training the neural network of the method.

The method further comprises training the neural network using the generated training pair. Typically, the neural network to be trained requires a large number of training datasets in order for precise training and effective operation. Hence, in order for the neural network to perform efficiently and accurately, a significant number of the at least one document and even greater number of training pairs are generated from amongst the data in each of the at least one document and required for the training of the neural network. Typically, with each training pair used by the neural network, the performance of the neural network get enhanced i.e., the accuracy and quality of the results provided by the neural network is increased and thus, results in the elimination of human involvement altogether.

Optionally, the method further comprising adding a tag to each of the detected at least one entity, wherein the tag comprises at least one of an associated text string, an entity location, a start index, and an end index of the at least one tagged entity. The term "tag" as used herein relates to a type of data configured for mapping or describing information such as, within a document, web page, or another digital file. The tag provides details about the at least one entity and enables the method to locate and thereby process the at least one entity in an efficient manner. Herein, the entity location refers to the coordinates of the location of the at least one entity, which is to be detected, with respect to the at least one document. Herein an associated text string corresponds to the text entity located at the shortest distance from the entity location. Thus, each of the detected at least one entity would be added with the tag containing one or more of the text entity associated with the at least one entity, the location of the at least one entity with respect to the at least one document, the start index, and the end index. Optionally, the tag further comprises a likelihood of the at least one detected entity. In an example, the tag may be represented as {"objects": [{"label": "state_name", "$x_{min}$": 243.201171875, "$y_{min}$": 48.0, "$x_{max}$": 611.0009155273438, "$y_{max}$":122.0, "likelihood":5}. In operation, upon detecting the at least one entity, the method further comprises extracting the text entity from the at least one document and adding the tag (such as, via a tagging tool) for labelling the at least one detected entity for enabling named entity recognition (NER) via the method.

In an exemplary implementational scenario, the at least one document is a driver's license of a person, wherein the driver license document comprises at least one of a driver's license number, date of birth, date of expiry, class, street address, city, date of issue, restriction, gender, eyes, first name, last name, middle name, and so forth, each associated with the at least one entity to be detected. Thus, to detect the at least one entity and thereby add the tag to the at least one entity, the method comprises employing an image-tagging tool for labelling and/or creating bounding boxes associated with (or around) the text entity of the at least one document. Further, the method comprises employing the labelled text entity and the tag to combine the output to get labelled NER annotations on the extracted text.

In the exemplary implementational scenario, upon adding the tag to the at least one entity, a corresponding JSON file is generated comprising the mapping of entity coordinates and labels of the bounding boxes drawn on the at least one entity of the at least one document. Consequently, the JSON file is generated: {"label": "DRIVERS_LICENSE_NUMBER", "xmin": 311.5615234375, "ymin": 126.6025390625, "xmax": 430.1248092651367, "ymax": 149.0, "likelihood":

5}, {"label": "DATE_OF_BIRTH", "xmin": 282.8603515625, "ymin": 151.0, "xmax": 422.0, "ymax": 173.0, "likelihood":5}, {"label": "DATE_OF_EXPIRY", "xmin": 480.1982421875, "ymin": 151.318359375, "xmax": 619.337890625, "ymax": 173.318359375, "likelihood": 5}, {"label": "CLASS", "xmin": 517.130859375, "ymin": 126.73046875, "xmax": 541.4308586120605, "ymax":149.53046798706055, "likelihood": 5}, {"label": "STREET_ADDRESS", "xmin": 227.82421875, "ymin": 223.7431640625, "xmax":417.6830291748047, "ymax": 239.41958045959473, "likelihood": 5}, {"label": "City", "xmin": 226.6787109375, "ymin": 240.0, "xmax":355.0, "ymax": 258.19785499572754, "likelihood": 5}, {"label": "DATE_OF_ISSUE", "xmin": 251.4130859375, "ymin": 277.1220703125, "xmax": 387.57395935058594, "ymax": 299.81554794311523, "likelihood": 5}, {"label": "RESTRICTION", "xmin": 530.3515625, "ymin": 257.904296875, "xmax": 548.3515625, "ymax": 276.6242961883545, "likelihood": 5}, {"label": "GENDER", "xmin": 448.087890625, "ymin": 278.9970703125, "xmax": 466.087890625, "ymax": 297.7170696258545, "likelihood": 5}, {"label": "HEIGHT", "xmin": 503.0302734375, "ymin": 278.9970703125, "xmax": 546.0, "ymax": 297.0, "likelihood": 5}, {"label": "EYES", "xmin": 591.48828125, "ymin": 276.8671875, "xmax": 634.4580078125, "ymax": 294.8701171875, "likelihood": 5}, {"label": "FIRST_NAME", "xmin":228.37890625, "ymin": 197.0, "xmax": 319.350830078125, "ymax": 217.7470703125, "likelihood": 5}, {"label": "LAST_NAME", "xmin":228.12890625, "ymin": 175.1220703125, "xmax": 319.100830078125, "ymax": 195.0, "likelihood": 5}, {"label": "MIDDLE_NAME", "xmin":322.619140625, "ymin": 197.0, "xmax": 341.0, "ymax": 218.0, "likelihood": 5}, {"label": "FIRST_NAME", "xmin": 29.0048828125, "ymin":267.017578125, "xmax": 48.0, "ymax": 336.0, "likelihood": 5}, {"label": "State", "xmin": 356.2802734375, "ymin": 240.6298828125,"xmax": 380.0, "ymax": 258.0, "likelihood": 5}, {"label": "Zip", "xmin": 383.0, "ymin": 240.365234375, "xmax": 490.9251174926758,"ymax": 258.0, "likelihood": 5}, {"label": "SIGNATURE", "xmin": 244.55859375, "ymin": 316.0, "xmax": 585.0, "ymax": 396.92724609375,"likelihood": 5}, {"label": "WEIGHT", "xmin": 502.0, "ymin": 297.91796875, "xmax": 545.3642578125, "ymax": 315.0, "likelihood": 5}], "polygonObjects": [ ], "document_type": " ", "upside_down": false, "end_of_file": false, "end_of_form": false, "rotation_angle": "0", "instruction_page": false, "rejected": false, "document_artifacts": [ ], "medium_quality": false, "tax_return_type": { }, "form_1099_type": { }, "corporate_tax_return_type": { }, "partnership_tax_return_type": 0, "height": 406, "width": 650}.

Further, in the exemplary implementational scenario, the method further comprises processing the at least one document via the extraction module to detect the text entities, wherein the extraction modules comprises the Optical Character Recognition (OCR) software for processing thereof. Upon performing the processing via the extraction module the corresponding text entities and their associated word-level coordinates are extracted as: Text: "DRIVER LICENSE ALABAMA NO. 1234567 CLASS D D.O.B. Jan. 5, 1948 EXP Jan. 5, 2014 CONNOR SAMPLE 1 WONDERFUL DRIVE MONTGOMERY AL 36 104-1234 ENDORSEMENTS RESTRICTIONS A issue Jan. 5, 2010 SEX MHT 5-05 EYES BLU WT 120 HAIR BLN 0627 062f 0627 0631 0647 0627 06cc 06a9 0627 0646\u0627 062f 0627 SAMPLE Connor Sample Colonel Hugh B. McCall Director of Public Safety" and the Word-level coordinates as: Word_coords: [{"confidence": 0.99, "vertices": [{"x": 1952.0, "y": 490.0}, {"x": 2811.0, "y": 490.0}, {"x": 2811.0, "y": 693.0}, {"x": 1952.0, "y": 693.0}], "normalized vertices": [{"x": 0.33378932, "y": 0.118586645}, {"x": 0.48067716, "y": 0.118586645}, {"x": 0.48067716, "y": 0.16771539}, {"x": 0.33378932, "y": 0.16771539}], "word": "DRIVER", "startIndex": 0, "endIndex": 7}, {"confidence": 0.99, "vertices":[{"x": 2898.0, "y": 490.0}, {"x": 3885.0, "y": 490.0}, {"x": 3885.0, "y": 693.0}, {"x": 2898.0, "y": 693.0}], "normalized vertices": [{"x": 0.49555403, "y": 0.118586645}, {"x": 0.6643297, "y": 0.118586645}, {"x": 0.6643297, "y": 0.16771539}, {"x": 0.49555403, "y":0.16771539}], "word": "LICENSE\n", "startIndex": 7, "endIndex": 15}, {"confidence": 0.99, "vertices": [{"x": 2388.0, "y": 695.0}, {"x":5134.0, "y": 684.0}, {"x": 5136.0, "y": 1332.0}, {"x": 2391.0, "y": 1343.0}], "normalized vertices": [{"x": 0.40834475, "y": 0.16819942}, {"x":0.877907, "y": 0.16553727}, {"x": 0.878249, "y": 0.32236207}, {"x": 0.40885773, "y": 0.3250242}], "word": "ALABAMA\n", "startIndex":15, "endIndex": 23}, {"confidence": 0.96, "vertices": [{"x": 2485.0, "y": 1405.0}, {"x": 3746.0, "y": 1380.0}, {"x": 3750.0, "y": 1602.0}, {"x":2489.0, "y": 1627.0}], "normalized vertices": [{"x": 0.4249316, "y": 0.34002903}, {"x": 0.64056087, "y": 0.3339787}, {"x": 0.6412449, "y": 0.3877057}, {"x": 0.4256156, "y": 0.39375606}], "word": "NO. 1234567\n", "startIndex": 23, "endIndex": 34}, . . . ].

Furthermore, in the exemplary implementational scenario, the method further comprises generating the training pair comprising the at least one entity and corresponding text entity and training the neural network using the generated training pair. Typically, the tagged JSON entities and the extracted OCR word-level coordinates, exact position of the text entity for which labels and/or keys in the extracted text entity are collectively employed to generate the training pair in NER data format. The generated training pair for the exemplary implementational scenario: ('LICENSE ALAMA ALABAMA SAMPLE NO. 1234567 CLASS D D.O.B. Mar. 21, 1968 EXP Mar. 21, 2010 CONNOR SAMPLE 1 WONDERFUL DRIVE MONTGOMERY AL 36104-1234 ENDORSEMENTS RESTRICTIONS A issue Mar. 21, 2009 SEX F HT 5-05 EYES BLU WT 120 HAIR BRO Connor Sample Colonel Hugh B. McCall Director of Public Safety ETERAN', {'entities': [(34, 41, 'DRIVERS_LICENSE_NUMBER', {'entities': (57, 67, 'DATE_OF_BIRTH'), (72, 82, 'DATE_OF_EXPIRY'), (97, 114, 'STREET_ADDRESS'), (129, 139, 'Zip'), (187, 188, 'GENDER'), (209, 212, 'WEIGHT'), (90, 96, 'FIRST_NAME'), (22, 28, 'FIRST_NAME'), (83, 89, 'LAST_NAME'), (115, 125, 'City'), (166, 167, 'RESTRICTION'), (202, 205, 'EYES'), (192, 196, 'HEIGHT'), (14, 21, 'state_name'), (172, 182, 'DATE_OF_ISSUE'), (48, 49, 'CLASS'), (126, 128, 'State')]}).

In another aspect, an embodiment of the present disclosure provides a method for detecting at least one entity in a document, the method comprising:

inputting the at least one document to the trained neural network; and executing the trained neural network to detect the at least one entity.

Herein the neural network after being trained, is implemented to detect the at least one entity in the document, where the at least one entity to be detected may be one or more of the widget entity, the text image or the image entity. Once, the at least one document is obtained, the neural network as per its training, starts the process of detecting the at least one entity according to the mechanisms the neural network has been trained on.

Optionally, the method for detecting the at least one entity in the document further comprising, generating the relevant inferences associated with the detected at least one entity from the trained neural network. Herein, the "inferences" refer to the analysis derived from the training data being inputted into the neural networks. In context of the present disclosure, the inferences derived in the method would correspond to the analysis of particular text associated to the detected at least one entity where the particular text attributes to the purpose and the implementation of the detected at least one entity. The derived inferences would help in developing a better understanding of the context in which the detected at least one entity is intended to be used for and thereby generate conclusions on whether the purpose of the detected at least one entity in being served properly on not.

In another aspect, an embodiment of the present disclosure provides a method for detecting at least a widget entity in a document to derive relevant inferences therefrom, comprising:
  obtaining at least one document;
  converting the at least one document into a gray document;
  thresholding the gray document to form a binary document;
  performing morphological transformations on the binary document to detect horizontal and vertical edges therein;
  performing morphological dilation on the detected horizontal and vertical edges to provide improved horizontal and vertical edges;
  defining bounding boxes associated with pairs of the improved horizontal and vertical edges;
  filtering the defined bounding boxes based on a median text height for detecting a widget entity;
  deriving a tensor from the detected widget entity;
  converting the derived tensor into convolutional layers;
  merging the convolutional layers based on a number of channels defined therein, to form pooling layers;
  converting the pooling layers into a defined vector, wherein the defined vector is a 1-D array;
  generating a dense layer from the defined vector;
  performing a sigmoid function on the generated dense layer to classify the widget entity;
  modifying, the classified widget entity into a corresponding machine-readable widget entity based on the detected state;
  processing, the at least one document via an extraction module to detect a text entity in near vicinity of the checkbox; and
  employing the machine-readable widget-entity and the associated text entity to derive the relevant inferences therefrom.

Herein, the widget entity may be a checkbox. The term "checkbox" refers to a graphical widget entity that allows a user to make a binary choice i.e., a choice made between two mutually exclusive options. For example, the checkbox may be configured to allow the user to make a yes or no choice. Typically, the checkbox is said to be in an unchecked state till the user hasn't made the binary choice the checkbox is configured for, whereas once the binary choice has been made by the user, the checkbox is said to be in a checked state.

Moreover, the present disclosure also relates to the system as described above. Various embodiments and variants disclosed above apply mutatis mutandis to the system.

In another aspect, an embodiment of the present disclosure provides a system for training a neural network to be implemented for detecting at least one entity in a document to derive relevant inferences therefrom, the system comprising:
  a database configured to store at least one document; and
  a processor communicably coupled to the database, wherein the processor is configured to:
    process, the at least one document via a detection module to detect a widget entity, wherein the detected widget entity is classified as active or inactive based on a detected state of the widget entity;
    modify, the classified widget entity into a corresponding machine readable widget-entity based on the detected state;
    process, the at least one document via an extraction module to detect a text entity in near vicinity of the classified widget entity;
    generate a training pair comprising the machine readable widget entity and the corresponding text entity; and
    train the neural network using the generated training pair.

Herein, the 'processor' refers to a structure and/or module that includes programmable and/or non-programmable components configured to store, process and/or share information and/or signals relating to the generating the search string. The processor may be a controller having elements, such as a display, control buttons or joysticks, processors, memory and the like. Typically, the processor is operable to perform one or more operations for detecting the at least one entity in the document. In the present examples, the processor may include components such as memory, a processor, a network adapter and the like, to store, process and/or share information with other computing components, such as a user device, a remote server unit, a database.

Optionally, the processor includes any arrangement of physical or virtual computational entities capable of enhancing information to perform various computational tasks. Further, it will be appreciated that the remote server may be implemented as a hardware server and/or plurality of hardware servers operating in a parallel or in a distributed architecture. Optionally, the processor is supplemented with additional computation system, such as neural networks, and hierarchical clusters of pseudo-analog variable state machines implementing artificial intelligence algorithms. In an example, the processor may include components such as a memory, a data communication interface, a network adapter and the like, to store, process and/or share information with other computing devices, such as the processor, the database, a user device.

Optionally, the processor is implemented as a computer program that provides various services (such as database service) to other devices, modules or apparatus. Moreover, the processor refers to a computational element that is operable to respond to and processes instructions to perform the detection of the at least one entity in the document. Optionally, the processor includes, but is not limited to, a microprocessor, a micro-controller, a complex instruction set computing (CISC) microprocessor, a reduced instruction set (RISC) microprocessor, a very long instruction word (VLIW) microprocessor, Field Programmable Gate Array (FPGA) or any other type of processing circuit, for example as aforementioned.

Additionally, the processor is arranged in various architectures for responding to and processing the instructions for detecting the at least one entity in the document via the method or system. Herein, the system elements may communicate with each other using a communication interface. The communication interface includes a medium (e.g., a communication channel) through which the system components communicates with each other. Examples of the communication interface include, but are not limited to, a communication channel in a computer cluster, a Local Area Communication channel (LAN), a cellular communication channel, a wireless sensor communication channel (WSN), a cloud communication channel, a Metropolitan Area Communication channel (MAN), and/or the Internet. Optionally, the communication interface comprises one or more of a wired connection, a wireless network, cellular networks such as 2G, 3G, 4G, 5G mobile networks, and a Zigbee connection.

The present disclosure also provides a computer-readable storage medium comprising instructions which, when executed by a computer, cause the computer to carry out the steps of the method for detecting the at least one entity. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

In an embodiment, the system further comprises a user-interface configured to display the generated training pair for deriving the relevant inferences therefrom. Herein, the term "user-interface" (UI) refers to a medium of user interaction with the system or generally to any computer, website, or application. The goal of an effective user-interface is to make the user experience smooth and intuitive, requiring minimum effort to receive the desired outcome, preferably in the shortest period of time. The first user-interface may be at least one of a Graphical User Interfaces (GUI), Command Line Interfaces (CLI), Form-based interfaces, Menu-based interfaces, Natural language interfaces. Herein, the "user-interface" may be in the form of a website or an application. The user-interface represents a way through which a user i.e., the person in need of the system for detecting the at least one entity, may operate therewith. The system of the present disclosure may include the user-interface in order to enable the user to view the relevant inferences derived from the generated training pairs being displayed to the user through the user-interface.

Optionally, the processor is further configured to add a tag to each of the detected at least one entity, wherein the tag comprises at least one of an associated text string, an entity location, a start index, and an end index of the at least one tagged entity.

Optionally, the processor configured to process the at least one document via the detection module is further configured to:
convert the at least one document into a gray document;
threshold the gray document to form a binary document;
perform morphological transformations on the binary document to detect horizontal and vertical edges therein;
perform morphological dilation on the detected horizontal and vertical edges to provide improved horizontal and vertical edges;
define bounding boxes associated with pairs of the improved horizontal and vertical edges; and
filter the defined bounding boxes based on a median text height for detecting the widget entity.

Optionally, the processor configured to process the at least one document via the extraction module is further configured to utilize location of the detected widget entity to detect the text entity in near vicinity based on a shortest distance.

Optionally, the processor configured to classify the detected widget entity using a classification algorithm, is further configured to:
convert a tensor derived from the detected entity document into convolutional layers;
merge the convolutional layers based on a number of channels defined therein to form pooling layers;
convert the pooling layers into a defined vector, wherein the defined vector is a 1-D array;
generate a dense layer from the defined vector; and
perform a sigmoid function on the generated dense layer to form a sigmoid layer to classify the detected widget entity.

DETAILED DESCRIPTION OF DRAWINGS

Referring to FIG. 1, illustrated is a block diagram of a system 100 for training a neural network to be implemented for detecting at least one entity in a document to derive relevant inferences therefrom, in accordance with an embodiment of the present disclosure. As shown, the system 100 comprises a database 102 configured to store the program code and the obtained at least one document to be processed via the system 100. Further, the system 100 comprises a processor 104 communicably coupled to the database 102 configured to perform a set of operations required to perform the detection of the at least one entity in the obtained at least one document. Optionally, the system 100 comprises a user-interface 106 configured to display the output of the neural network trained by the system to a user.

Figure 2:
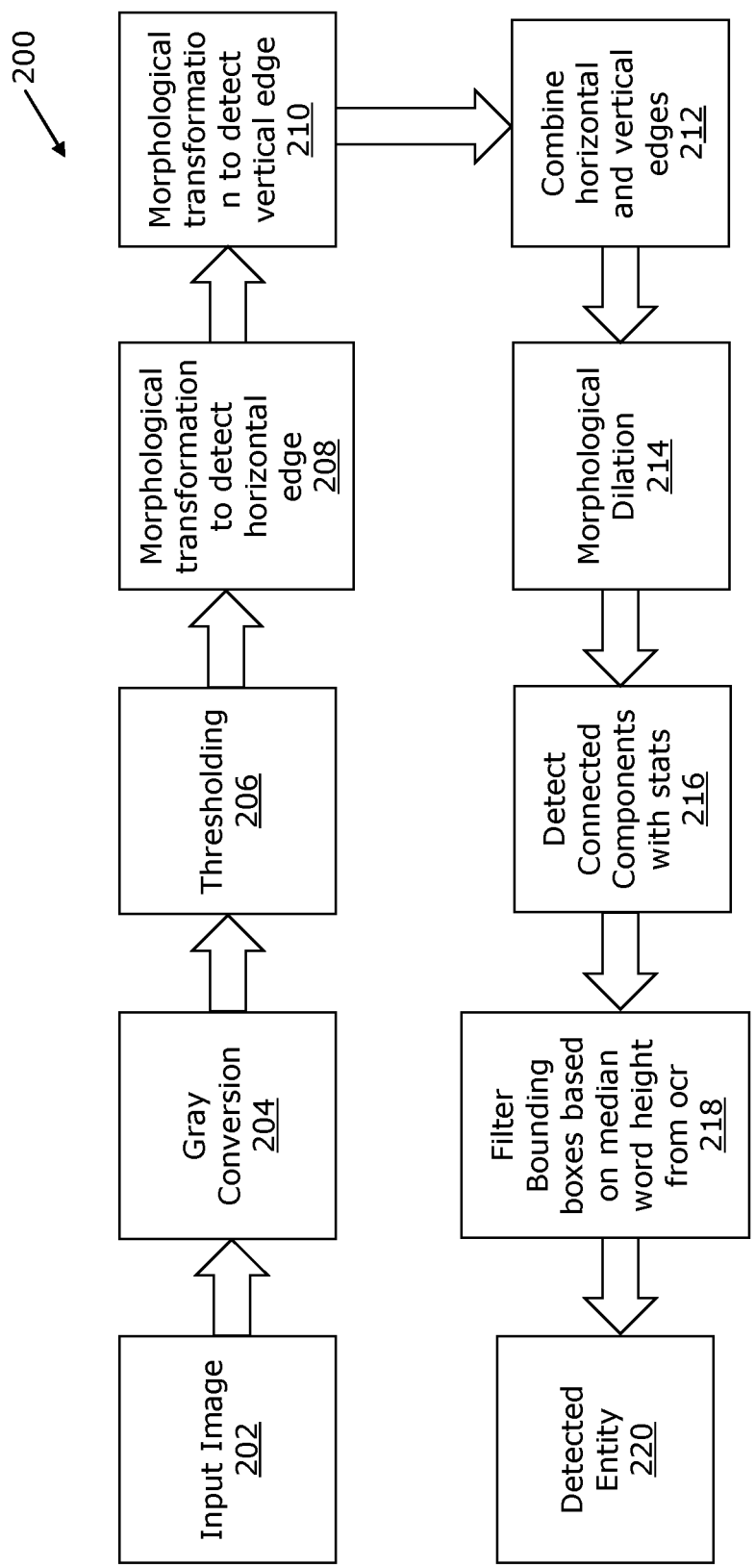
FIG. 2 illustrates a flowchart depicting steps implemented by a detection module for detecting a widget entity, in accordance with an embodiment of the present disclosure.

Referring to FIG. 2, illustrated is a flowchart depicting steps of a process 200 implemented by a detection module for detecting a widget entity, in accordance with an embodiment of the present disclosure. As shown, the process 200 followed by the detection module includes, at step 202, receiving at least one document as an input. The process 200 includes, at step 204, converting the at least one document into a gray document. The process 200 includes, at step 206, thresholding the gray document to form a binary document. The process 200 includes, at step 208 and 210, performing morphological transformations on the binary document to detect horizontal and vertical edges therein, respectively. The process 200 includes, at step 212, combining detected horizontal and vertical edges in the binary image. The process 200 includes, at step 214, performing morphological dilation on the detected horizontal and vertical edges to provide improved horizontal and vertical edges. The process 200 includes, at step 216, defining bounding boxes associated with pairs of the improved horizontal and vertical edges and the process 200 includes, at step 218, filtering the defined bounding boxes based on a median text height for detecting the widget entity.

Referring to FIGS. 3A to 3I, illustrated are exemplary visual representations 300A to 300I of each of the steps of the process 200 implemented by the detection module configured for detecting the widget entity, in accordance with various embodiments of the present disclosure. Herein, the each of the visual representations 300A to 300I are to be read in association with each of the steps 202 to 218. For example, FIG. 3A corresponds to the step 202, FIG. 3B corresponds to the step 204, FIG. 3C corresponds to the step 206 and the like. The detection module is configured to implement the steps of the process 200 as illustrated in FIG. 2, wherein the output or result of each step is illustrated in FIGS. 3A to 3I.

Referring to FIG. 3A, illustrated is the visual representation 300A corresponding to the step 202 of FIG. 2. As shown, the at least one document is received as input.

Referring to FIG. 3B, illustrated is the visual representation 300B corresponding to the step 204 of FIG. 2. As shown, the received at least one document undergoes gray conversion and is converted into a gray document.

Referring to FIG. 3C, illustrated is the visual representation 300C corresponding to the step 206 of FIG. 2. As shown, the converted gray document undergoes thresholding to form a binary document.

Figure 3D:
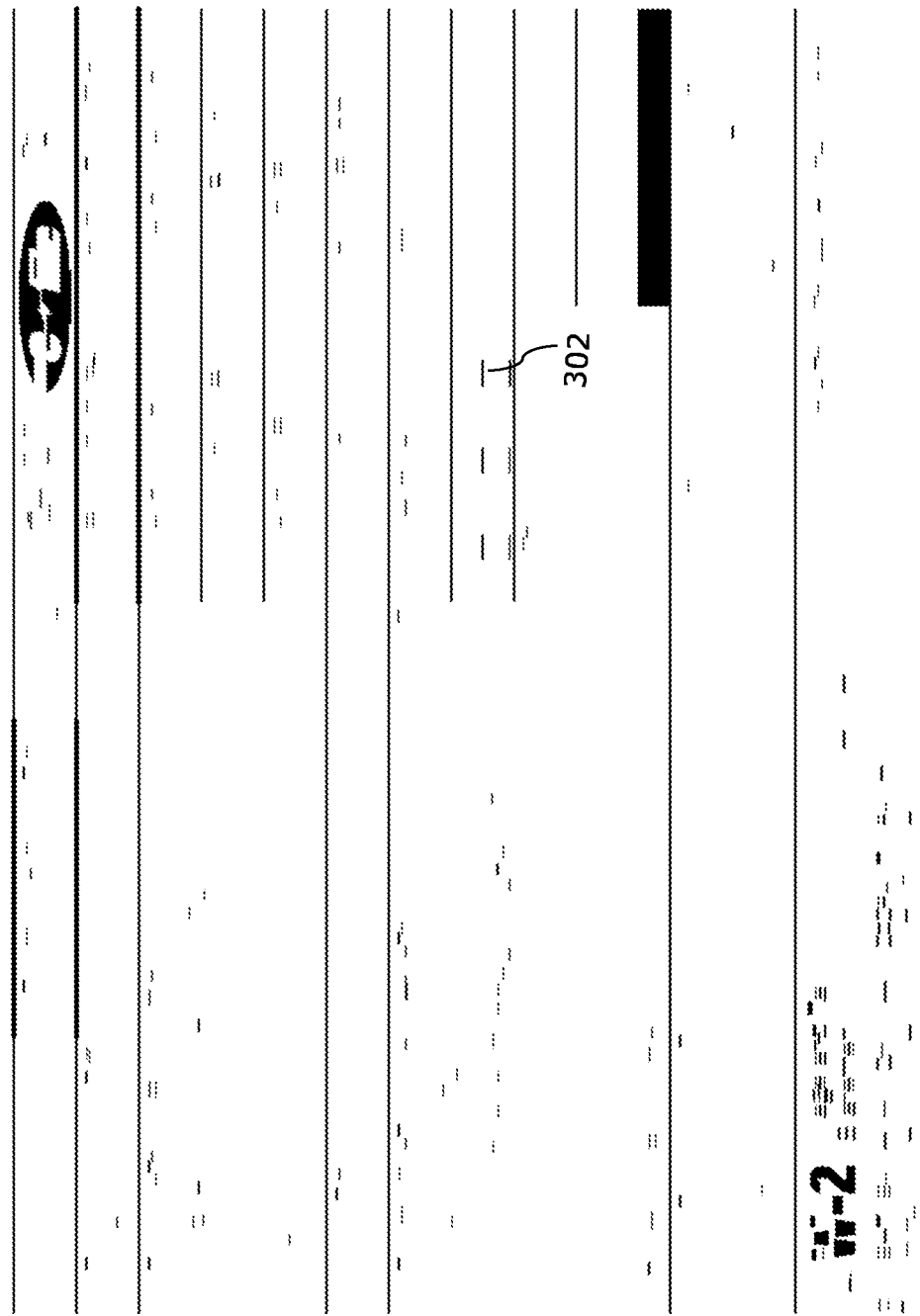
Figure 3E:
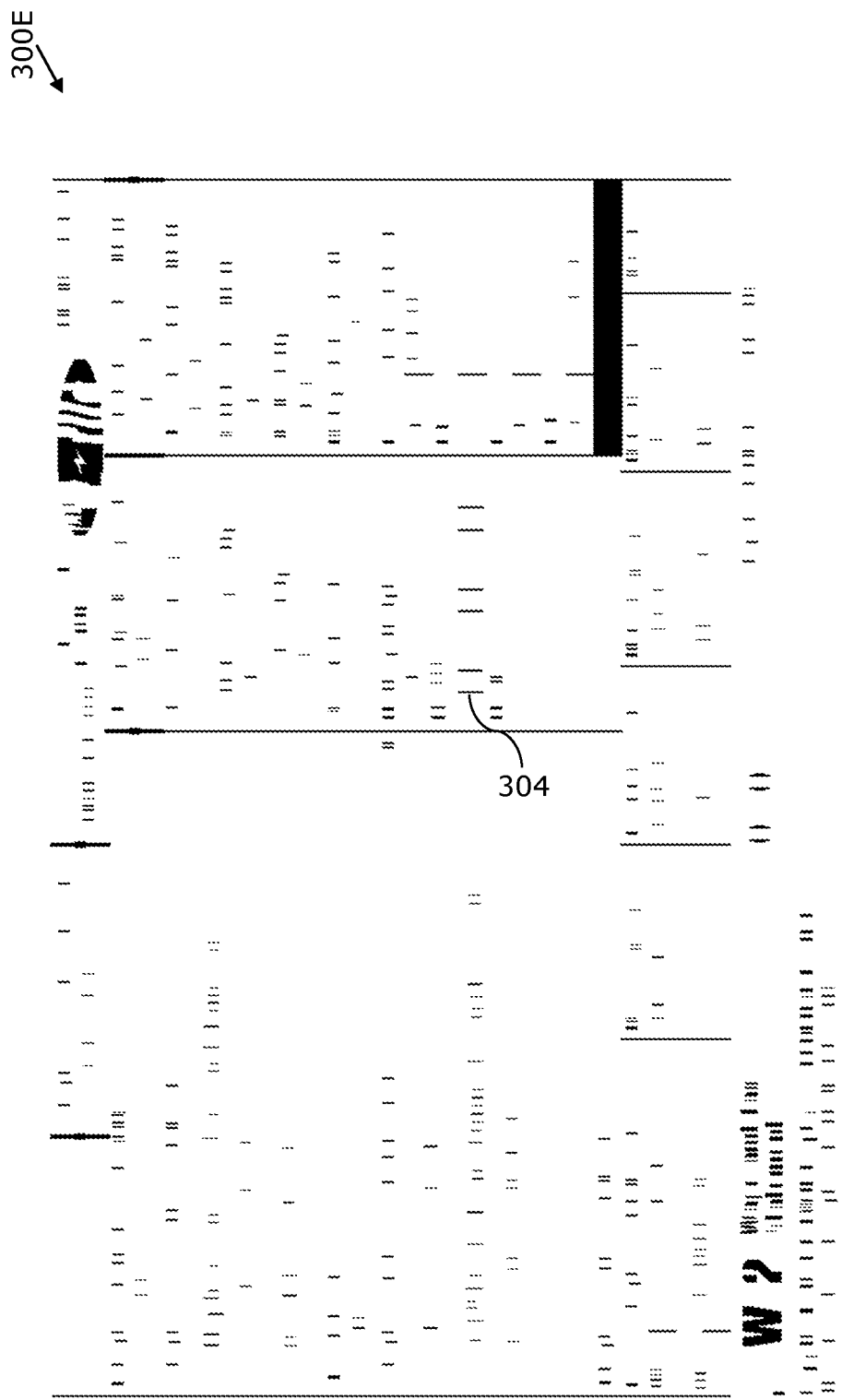

Referring to FIGS. 3D and 3E, illustrated are visual representations 300D and 300E corresponding to the step 208 and 210 of FIG. 2, respectively. As shown, the formed binary document undergoes morphological transformations to detect horizontal 302 and vertical edges 304 therein, respectively.

Figure 3F:
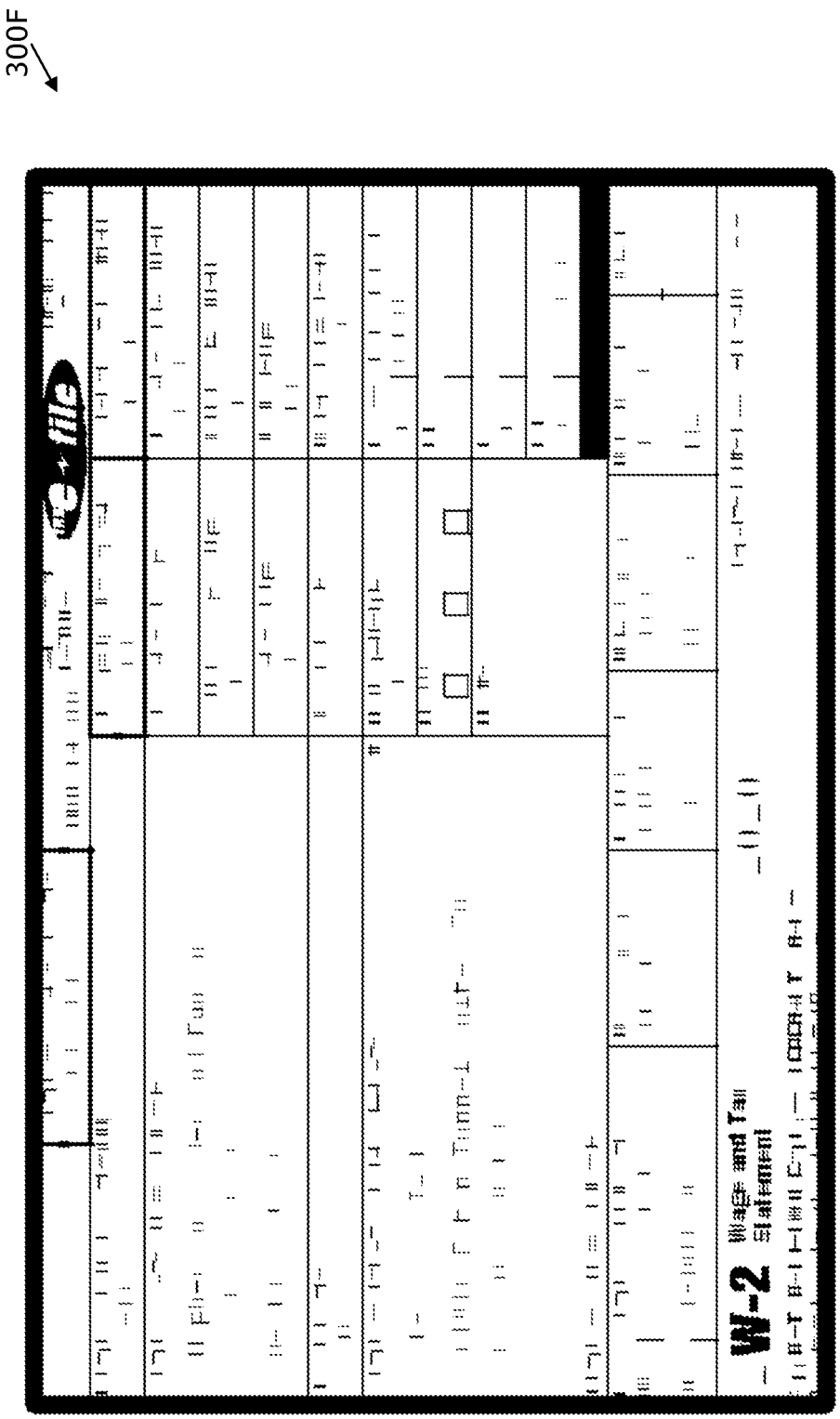

Referring to FIG. 3F, illustrated is the visual representation 300F corresponding to the step 212 of FIG. 2. As shown, the detected horizontal edges 302 and vertical edges 304 in the binary image are combined.

Figure 3G:
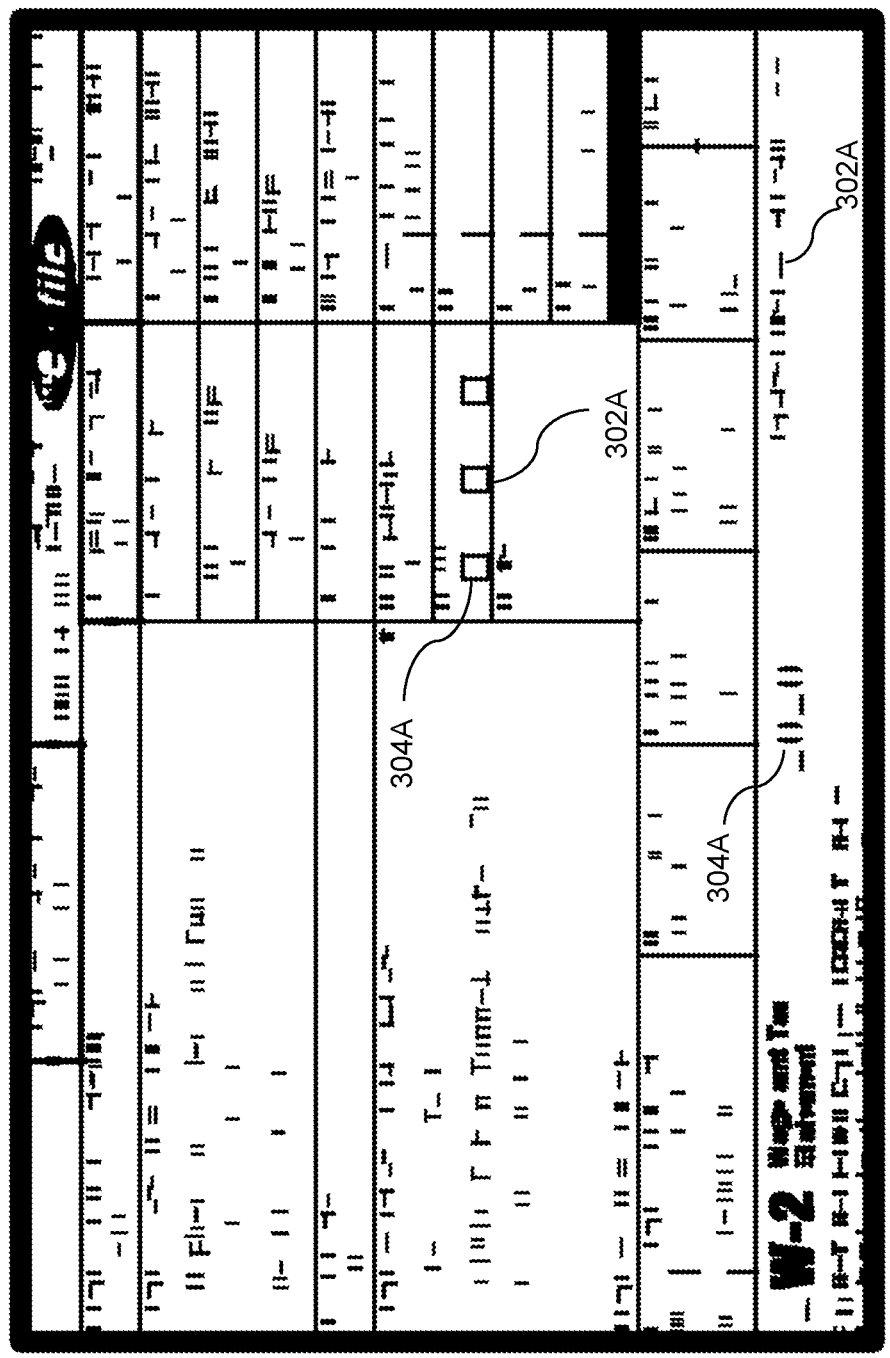

Referring to FIG. 3G, illustrated is the visual representation 300G corresponding to the step 214 of FIG. 2. As shown, the detected horizontal edges 302 and vertical edges 304 undergoes morphological dilations to provide improved horizontal edges 302A and vertical edges 304A.

Figure 3H:

Referring to FIG. 3H, illustrated is the visual representation 300H corresponding to the step 216 of FIG. 2. As shown, pairs of the improved horizontal edges 302A and vertical edges 302B are used to define bounding boxes 306A, 306B associated therewith Referring to FIG. 3I, illustrated is the visual representation 300I corresponding to the step 218 of FIG. 2. As shown, the defined bounding boxes 306A, 306B are filtered based on a median text height for detecting the widget entity 308 (same as defined bounding box 306A).

Figure 4:
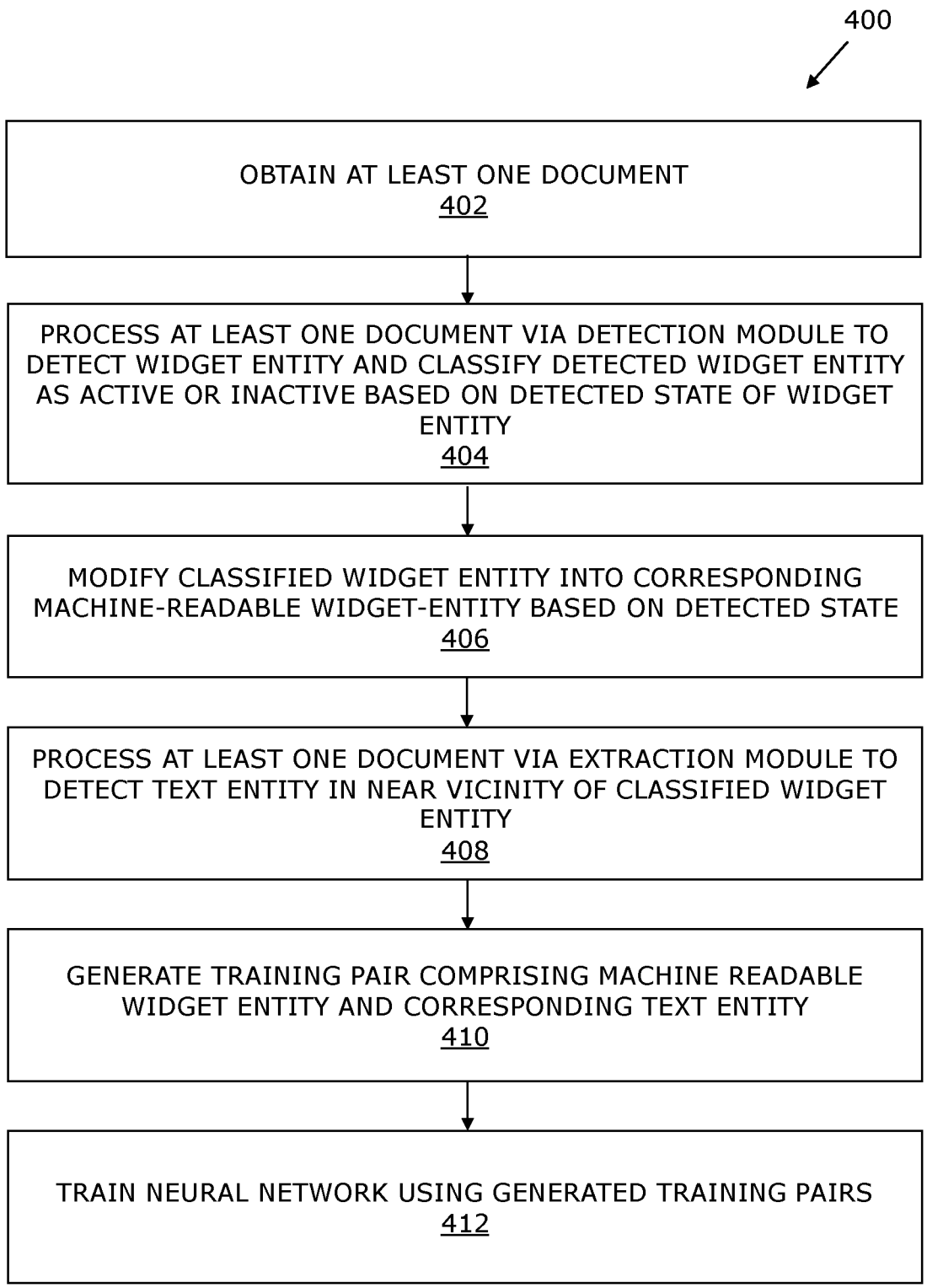
FIG. 4 illustrates a flowchart depicting steps of a method for training a neural network to be implemented for detecting at least one entity in a document to derive relevant inferences therefrom, in accordance with an embodiment of the present disclosure.

Referring to FIG. 4, illustrated is shown a flowchart depicting steps of a method 400 for training a neural network to be implemented for detecting at least one entity in a document to derive relevant inferences therefrom, in accordance with an embodiment of the present disclosure. As shown, the method 400 comprises steps 402, 404, 406, 408, 410 and 412. The method 400 comprises, at step 402, obtaining at least one document. The method 400 further comprises, at step 404, processing, the at least one document via a detection module to detect a widget entity, wherein the detected widget entity is classified as active or inactive based on a detected state of the widget entity. The method 400 further comprises, at step 406, modifying, the classified widget entity into a corresponding machine-readable widget-entity based on the detected state. The method 400 further comprises, at step 408, processing, the at least one document via an extraction module to detect a text entity in near vicinity of the classified widget entity. The method 400 further comprises, at step 410, generating a training pair comprising the machine-readable widget entity and the corresponding text entity, and at step 412, the method 400 comprises training the neural network using the generated training pair.

Figure 5:
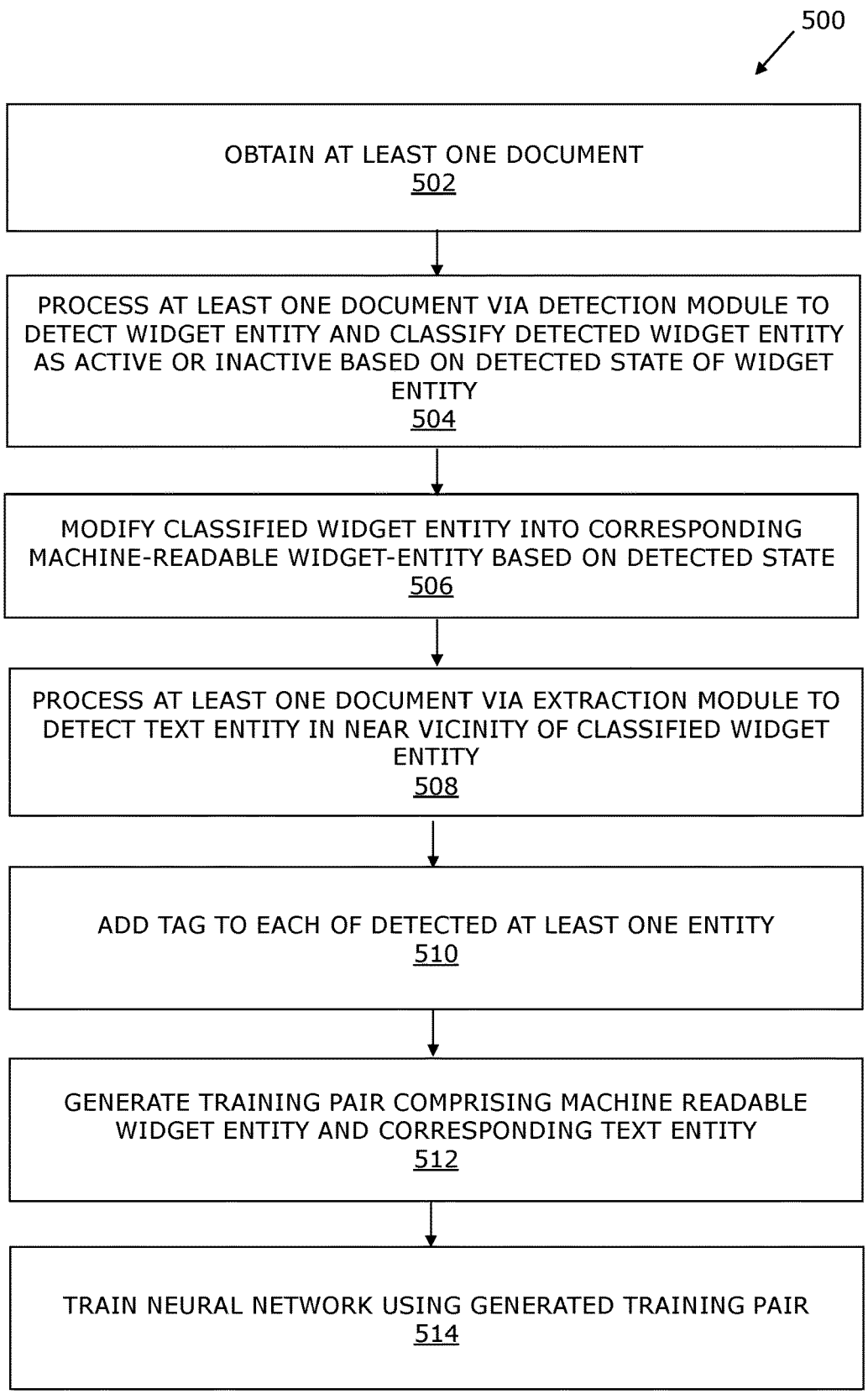
FIG. 5 illustrates a flowchart depicting steps of a method for training a neural network to be implemented for detecting at least one entity in a document to derive relevant inferences therefrom, in accordance with another embodiment of the present disclosure.

Referring to FIG. 5, illustrated is a flowchart depicting steps of a method 500 for training a neural network to be implemented for detecting at least one entity in a document to derive relevant inferences therefrom, in accordance with another embodiment of the present disclosure. As shown, the method 500 comprises steps 502, 504, 506, 508, 510, 512 and 514. The method 500 comprises, at step 502, obtaining at least one document. The method 500 further comprises, at step 504, processing, the at least one document via a detection module to detect a widget entity, wherein the detected widget entity is classified as active or inactive based on a detected state of the widget entity. The method 500 further comprises, at step 506, modifying, the classified widget entity into a corresponding machine-readable widget-entity based on the detected state. The method 500 further comprises, at step 508, processing, the at least one document via an extraction module to detect a text entity in near vicinity of the classified widget entity. The method 500 further comprises, at step 510, adding a tag to each of detected at least one entity such as, the widget entity or the text entity. The method 500 further comprises, at step 512, generating a training pair comprising the machine-readable widget entity and the corresponding text entity, and at step 514, the method 500 comprises training the neural network using the generated training pair.

Figure 6:
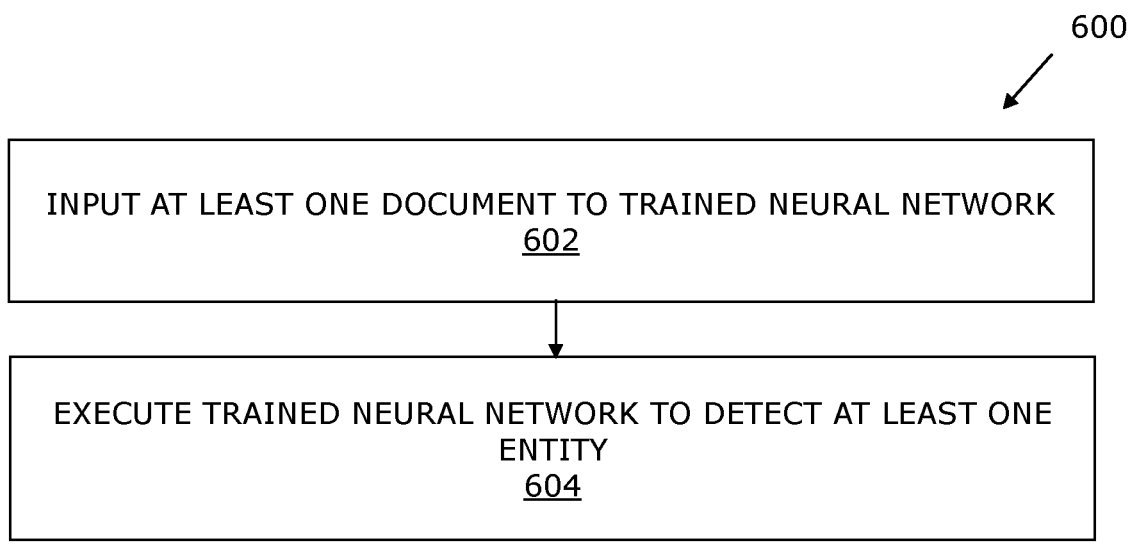
FIG. 6 illustrates a flowchart depicting steps of a method for detecting at least one entity in a document, in accordance with various embodiments of the present disclosure.

Referring to FIG. 6, illustrated is a flowchart depicting steps of a method 600 for detecting at least one entity in a document, in accordance with various embodiments of the present disclosure. Herein, the method 600 refers the implementation of the trained neural network to detect the at least one entity. As shown, the method 600 comprises at step 602, inputting the obtained at least one document to the trained neural network and at step 604, the method 600 further executing the trained neural network to detect at least one entity.

Figure 7A:
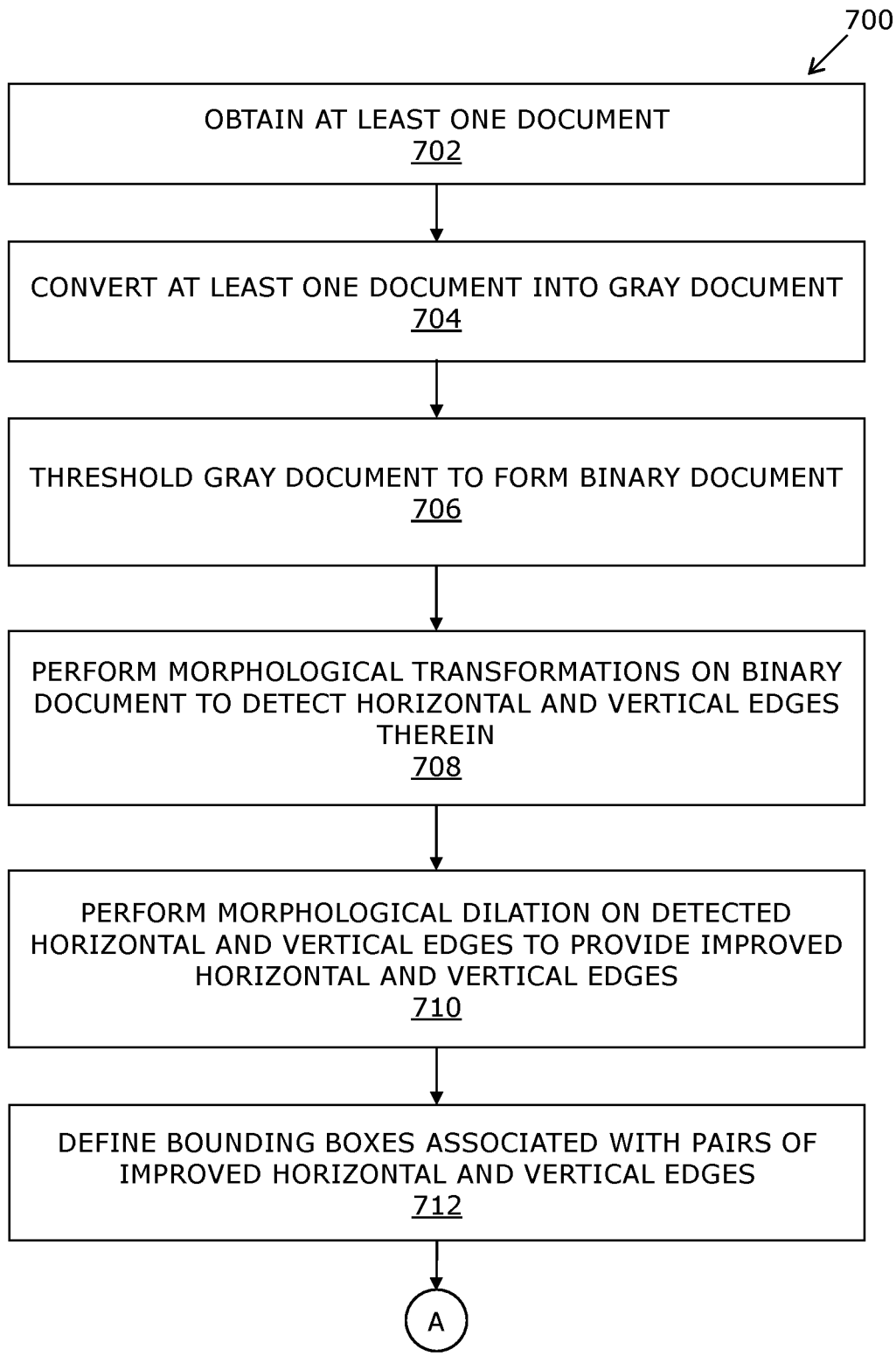
Figure 7C:
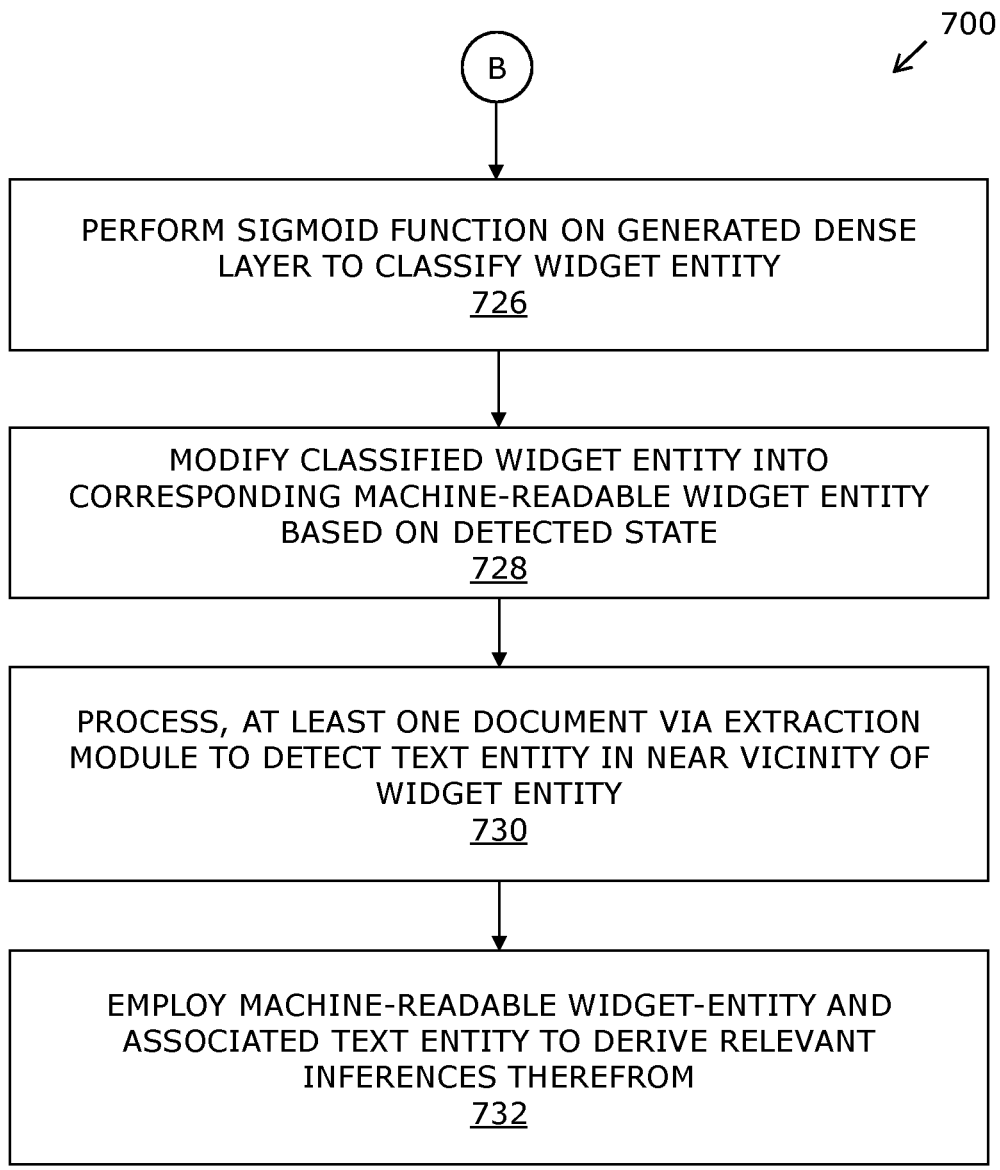

Referring to FIGS. 7A-7C, illustrated is a flowchart depicting steps of a method 700 for detecting at least a widget entity in a document to derive relevant inferences therefrom, in accordance with various embodiment of the present disclosure. As shown, the method 700 comprises steps 702, 704, 706, 708 up till step 732. The method 700 comprises, at step 702, obtaining at least one document. The method 700 further comprises, at step 704, converting the at least one document into a gray document. The method 700 further comprises, at step 706, thresholding the gray document to form a binary document. The method 700 further comprises, at step 708, performing morphological transformations on the binary document to detect horizontal and vertical edges therein. The method 700 further comprises, at step 710, performing morphological dilation on the detected horizontal and vertical edges to provide improved horizontal and vertical edges. The method 700 further comprises, at step 712, defining bounding boxes associated with pairs of the improved horizontal and vertical edges. The method 700 further comprises, at step 714, filtering the defined bounding boxes based on a median text height for detecting the widget entity. The method 700 further comprises, at step 716, deriving a tensor from the detected widget entity. The method 700 further comprises, at step 718, converting the derived tensor into convolutional layers. The method 700 further comprises, at step 720, merging the convolutional layers based on a number of channels defined therein, to form pooling layers. The method 700 further comprises, at step 722, converting the pooling layers into a defined vector, wherein the defined vector is a 1-D array. The method 700 further comprises, at step 724, generating a dense layer from the defined vector. The method 700 further comprises, at step 726, performing a sigmoid function on the generated dense layer to classify the widget entity. The method 700 further comprises, at step 728, modifying, the classified checkbox into a corresponding machine-readable checkbox entity based on the detected state. The method 700 further comprises, at step 730, processing, the at least one document via an extraction module to detect a text entity in near vicinity of the widget entity and the method 700 further comprises, at step 732, employing the machine-readable widget-entity and the associated text entity to derive the relevant inferences therefrom.

The invention claimed is:

1. A method for training a neural network to be implemented for detecting at least one entity in a document to derive relevant inferences therefrom, comprising:
   obtaining at least one document;
   processing, the at least one document via a detection module to detect a widget entity, wherein the detected widget entity is classified as active or inactive based on a detected state of the widget entity;
   modifying, the classified widget entity into a corresponding machine-readable widget entity based on the detected state;
   processing, the at least one document via an extraction module to detect a text entity in near vicinity of the classified widget entity;
   generating a training pair comprising the machine-readable widget entity and the corresponding text entity; and
   training the neural network using the generated training pair,
   wherein the detected at least one entity comprises adding a tag to each of the detected at least one entity for labelling the detected at least one entity for enabling named entity recognition (NER), and wherein the tag comprises a likelihood of the detected at least one entity.

2. The method of claim 1, wherein the tag further comprises at least one of an associated text string, an entity location, a start index, and an end index of the at least one tagged entity.

3. The method of claim 1, wherein processing the at least one document via the detection module comprises:
   converting the at least one document into a gray document;
   thresholding the gray document to form a binary document;
   performing morphological transformations on the binary document to detect horizontal and vertical edges therein;
   performing morphological dilation on the detected horizontal and vertical edges to provide improved horizontal and vertical edges;
   defining bounding boxes associated with pairs of the improved horizontal and vertical edges; and
   filtering the defined bounding boxes based on a median text height for detecting the widget entity.

4. The method of claim 1, wherein processing the at least one document via the extraction module comprises utilizing location of the detected widget entity to detect the text entity in near vicinity based on a shortest distance.

5. The method of claim 1, wherein the at least one entity comprises at least one of the widget entity, the text entity, an image entity or an object entity, and wherein the widget entity comprises at least one of the bounding box, a checkbox, a list, a checkbox list, a radio button, an array.

6. The method of claim 1, wherein the extraction module comprises at least an Optical Character Recognition (OCR) software.

7. The method of claim 1, wherein the detection module comprises at least one of an object detection algorithm, an image recognition algorithm, or a text-recognition algorithm.

8. The method of claim 7, wherein the object detection algorithm is performed using at least one of a region based convolutional neural network (R-CNN), a fast R-CNN, Histogram of oriented gradients, Single shot detector (SSD), Spatial Pyramid Pooling (SPP-net), You only look once (YOLO) algorithm.

9. The method according to claim 7, wherein the image recognition algorithm is performed using at least one of Scale-invariant Feature Transform (SIFT), Speeded Up Robust Features (SURF), Principal Component Analysis (PCA), and Linear Discriminant Analysis (LDA).

10. The method according to claim 1, wherein the detected widget entity is classified using a classification algorithm, wherein the classification algorithm comprises:
    deriving a tensor from the detected widget entity;
    converting the derived tensor into convolutional layers;
    merging the convolutional layers based on a number of channels defined therein, to form pooling layers;
    converting the pooling layers into a defined vector, wherein the defined vector is a 1-D array;
    generating a dense layer from the defined vector; and
    performing a sigmoid function on the generated dense layer to classify the widget entity.

11. A method for detecting at least one entity in a document, the method comprising:
    inputting the at least one document to the trained neural network according to claim 1; and
    executing the trained neural network to detect the at least one entity.

12. The method of claim 11, further comprising generating the relevant inferences associated with the detected at least one entity from the trained neural network.

13. A computer program product comprising a non-transitory computer readable storage medium having computer-readable instructions stored thereon, the computer readable instructions being executable by a computerized device comprising data processing hardware to execute a method as claimed in claim 1.

14. A method for detecting at least a widget entity in a document to derive relevant inferences therefrom, comprising:
    obtaining at least one document;
    converting the at least one document into a gray document;
    thresholding the gray document to form a binary document;
    performing morphological transformations on the binary document to detect horizontal and vertical edges therein;
    performing morphological dilation on the detected horizontal and vertical edges to provide improved horizontal and vertical edges;
    defining bounding boxes associated with pairs of the improved horizontal and vertical edges;

filtering the defined bounding boxes based on a median text height for detecting the widget entity;
deriving a tensor from the detected widget entity;
converting the derived tensor into convolutional layers;
merging the convolutional layers based on a number of channels defined therein, to form pooling layers;
converting the pooling layers into a defined vector, wherein the defined vector is a 1-D array;
generating a dense layer from the defined vector;
performing a sigmoid function on the generated dense layer to classify the widget entity;
modifying, the classified widget entity into a corresponding machine-readable widget entity based on the detected state;
processing, the at least one document via an extraction module to detect a text entity in near vicinity of the widget entity; and
employing the machine-readable widget-entity and the associated text entity to derive the relevant inferences therefrom,
wherein the detected at least one entity comprises adding a tag to each of the detected at least one entity for labelling the detected at least one entity for enabling named entity recognition (NER), and wherein the tag comprises a likelihood of the detected at least one entity.

15. A system for training a neural network to be implemented for detecting at least one entity in a document to derive relevant inferences therefrom, the system comprising:
a database configured to store at least one document; and
a processor communicably coupled to the database, wherein the processor is configured to:
process, the at least one document via a detection module to detect a widget entity, wherein the detected widget entity is classified as active or inactive based on a detected state of the widget entity;
modify, the classified widget entity into a corresponding machine-readable widget entity based on the detected state;
process, the at least one document via an extraction module to detect a text entity in near vicinity of the classified widget entity;
generate a training pair comprising the machine-readable widget entity and the corresponding text entity; and
train the neural network using the generated training pair,
wherein the detected at least one entity comprises adding a tag to each of the detected at least one entity for labelling the detected at least one entity for enabling named entity recognition (NER), and wherein the tag comprises a likelihood of the detected at least one entity.

16. The system of claim 15, further comprising a user-interface configured to display the generated training pair for deriving the relevant inferences therefrom.

17. The system of claim 15, wherein the tag further comprises at least one of an associated text string, an entity location, a start index, and an end index of the at least one tagged entity.

18. The system of claim 15, wherein the processor configured to process the at least one document via the detection module is further configured to:
convert the at least one document into a gray document;
threshold the gray document to form a binary document;
perform morphological transformations on the binary document to detect horizontal and vertical edges therein;
perform morphological dilation on the detected horizontal and vertical edges to provide improved horizontal and vertical edges;
define bounding boxes associated with pairs of the improved horizontal and vertical edges;
filter the defined bounding boxes based on a median text height for detecting the widget entity.

19. The system of claim 15, wherein the processor configured to process the at least one document via the extraction module is further configured to utilize location of the detected widget entity to detect the text entity in near vicinity based on a shortest distance.

20. The system according to claim 15, wherein the processor configured to classify the detected widget entity using a classification algorithm, is further configured to:
derive a tensor from the detected widget entity;
convert the derived tensor into convolutional layers;
merge the convolutional layers based on a number of channels defined therein, to form pooling layers;
convert the pooling layers into a defined vector, wherein the defined vector is a 1-D array;
generate a dense layer from the defined vector; and
perform a sigmoid function on the generated dense layer to classify the widget entity.

* * * * *